US008624605B2

(12) United States Patent
Hemmady et al.

(10) Patent No.: US 8,624,605 B2
(45) Date of Patent: Jan. 7, 2014

(54) APPARATUS AND METHOD TO DISTINGUISH NOMINALLY IDENTICAL OBJECTS THROUGH WAVE FINGERPRINTS APPARATUS AND METHOD TO DISTINGUISH NOMINALLY IDENTICAL OBJECTS THROUGH WAVE FINGERPRINTS

(75) Inventors: Sameer Hemmady, Thousand Oaks, CA (US); Steven M. Anlage, Laurel, MD (US)

(73) Assignee: University of Maryland, College Park, College Park, MD (US)

( * ) Notice: Subject to any disclaimer, the term of this patent is extended or adjusted under 35 U.S.C. 154(b) by 287 days.

(21) Appl. No.: 12/070,204

(22) Filed: Feb. 15, 2008

(65) Prior Publication Data
US 2010/0001743 A1    Jan. 7, 2010

Related U.S. Application Data

(60) Provisional application No. 60/890,338, filed on Feb. 16, 2007.

(51) Int. Cl.
*G01R 27/04* (2006.01)
*G01R 27/32* (2006.01)

(52) U.S. Cl.
USPC ................. 324/639; 342/22; 342/27; 342/28

(58) Field of Classification Search
USPC ........................................................ 324/639
See application file for complete search history.

(56) References Cited

U.S. PATENT DOCUMENTS

| 4,728,958 | A  | * | 3/1988  | Choate ......................... 342/424 |
| 5,103,427 | A  | * | 4/1992  | Erdol et al. ....................... 367/7 |
| 6,464,638 | B1 | * | 10/2002 | Adams et al. ................. 600/443 |
| 6,480,141 | B1 | * | 11/2002 | Toth et al. ........................ 342/22 |
| 6,885,191 | B1 | * | 4/2005  | Gleman ......................... 324/300 |
| 7,256,727 | B2 | * | 8/2007  | Fullerton et al. ................. 342/28 |
| 7,280,607 | B2 | * | 10/2007 | McCorkle et al. ............ 375/295 |
| 7,379,013 | B2 | * | 5/2008  | Dean et al. ....................... 342/27 |
| 2006/0152404 | A1 | * | 7/2006 | Fullerton et al. ................ 342/28 |
| 2006/0214835 | A1 | * | 9/2006 | Lee et al. ........................ 342/22 |
| 2007/0095139 | A1 | * | 5/2007 | Hara ............................. 73/628 |
| 2008/0111686 | A1 | * | 5/2008 | Hall et al. ...................... 340/552 |

OTHER PUBLICATIONS

Wiltron Model 6600A Series Programmable Sweep Generators Data Sheet/Specifications, Wiltron Corp., No Date.*
Wiltron Model 560 Scalar Network Analyzer Data Sheet/Specifications, Wiltron Corp., No Date.*

* cited by examiner

*Primary Examiner* — Melissa Koval
*Assistant Examiner* — Benjamin M Baldridge
(74) *Attorney, Agent, or Firm* — Whiteford, Taylor & Preston LLP; Joseph L. Morales

(57) ABSTRACT

The present invention exploits extreme sensitivity to initial conditions in ray-chaotic enclosures to create a method to distinguish nominally identical objects through their unique "wave fingerprints." The fingerprint can be measured through transmission of a pulsed microwave signal as a function of carrier frequency and time. When internal components are re-arranged, the Electromagnetic Fingerprints (EMF) changes in significant ways. The EMF can be detected by direct injection measurements of the enclosure or through remote measurement.

23 Claims, 21 Drawing Sheets
(11 of 21 Drawing Sheet(s) Filed in Color)

APPARATUS AND METHOD TO DISTINGUISH NOMINALLY IDENTICAL OBJECTS THROUGH WAVE FINGERPRINTS APPARATUS AND METHOD TO DISTINGUISH NOMINALLY IDENTICAL OBJECTS THROUGH WAVE FINGERPRINTS

CROSS-REFERENCE TO RELATED APPLICATION

This application is based upon and claims benefit of co-owned U.S. Provisional Patent Application Ser. No. 60/890,338, filed with the U.S. Patent and Trademark Office on Feb. 16, 2007, by the inventors herein entitled "Wave Fingerprint of Complicated Enclosures" the specification of which is incorporated herein by reference in its entirety.

BACKGROUND OF THE INVENTION

1. Field of the Invention

The present invention pertains to RF signatures of complicated enclosures, and more particularly relates to a system and method to determine a unique Electromagnetic Fingerprint for a complicated enclosure and to remotely interrogate and learn the identity of a complicated enclosure.

2. Background

Ray chaos is a well-defined mathematical concept. It can be defined abstractly in terms of the 'extreme sensitivity to initial conditions.' Chaotic systems are deterministic in the sense that there are precise mathematical equations that govern the evolution of the system. However, the solutions to those equations are extremely sensitive to the initial conditions. This makes it very difficult to make long-term predictions about chaotic systems because they are extremely sensitive to initial conditions and noise.

Formally, imagine two solutions ($x_1(t)$ and $x_2(t)$, where t is time) to the equations that govern the system. Assume that the two solutions arise from slightly different initial conditions. As the system evolves, the trajectories described by those solutions will diverge from each other. The divergence can be quantified by $\Delta x(t) = x_1(t) - x_2(t) \sim e^{\lambda t}$. The quantity $\lambda$ is the Lyapunov exponent of the system (generally, there is more than one). If the largest Lyapunov exponent of the system is positive, then the trajectories will diverge as a function of time, and chaos exists.

This definition can be applied to rays propagating inside complicated enclosures. A mathematical ray starting inside the enclosure from a certain point and going in a specific initial direction will travel straight through free space until it encounters a wall or other obstruction. At that point it undergoes specular scattering (angle of incidence=angle of reflection) and moves off in a new direction to encounter another obstruction, bounce there, and so on. A second ray starting from a slightly different position and pointing in a slightly different initial direction will follow its trajectory in the same manner. The distance between the two rays can be calculated as a function of time, as can the distance between scattering sites of the two rays. If there is ray chaos, these distance measures will increase exponentially in time, at least initially.

SUMMARY OF THE INVENTION

All computers are surrounded by RF shielding that makes them into electromagnetic resonators. It is well known from the high-power microwave community that external RF radiation can be injected into computer enclosures through a variety of means, such as cooling vents, power lines, peripheral cables, etc. These signals, once injected, will spread out inside the enclosure and generally excite a number of resonant modes. The signal that leaks out of the enclosure will have distinctive features as a function of time that characterizes the complicated internal details of the box.

If an object has a well-defined conducting enclosure and some amount of interior "free" space, then it can act as a resonator for many different types of waves. Such waves could be electromagnetic, acoustic (if the object is immersed in air or water or some other fluid), quantum mechanical, etc. Further, if the interior construction of the object is irregular in some manner, leading to the mathematically defined property of "ray chaos", or if the interior configuration is changing on some time scale, then the "wave characteristics" of the object have predictable statistical distributions. By "wave characteristics" is meant any or all of the following: (i) resonant frequencies, (ii) standing wave patterns, (iii) impedance, (iv) scattering matrix elements, (v) or any other reproducible wave property of a system. In a preferred, exemplary embodiment, where the wavelength of the waves is small compared to the object enclosure size, the "wave characteristics" of the object will then be a strong function of the frequency or the wavelength of the waves. Under these circumstances, the "wave characteristics" will provide a unique "fingerprint" of the object enclosure. Small changes to the interior will change the "fingerprint." The present invention exploits this extreme sensitivity to create a method to distinguish nominally identical objects through their unique "wave fingerprints." The fingerprint can be measured through transmission of a pulsed microwave signal as a function of carrier frequency and time. When internal components are re-arranged, the Electromagnetic Fingerprint (EMF) changes in significant ways. The EMF can be detected by direct injection measurements of the enclosure or through remote measurement.

It is, therefore, an object of the present invention to enable a system and method to determine a unique Electromagnetic Fingerprint for a complicated enclosure that avoids the disadvantages of the prior art.

Another object of the invention is to determine an electromagnetic fingerprint on an enclosure in both a contact and non-contact manner. A related object of the invention is to determine an electromagnetic fingerprint on an enclosure from remote sensors. A further related object of the invention is to determine an electromagnetic fingerprint on an enclosure using electromagnetic or acoustic energy beamed or directed at the object of interest.

It is another object of the invention is to determine an electromagnetic fingerprint on an enclosure in order to measure small changes (tampering) in the interior of the enclosure.

A further object of the invention is to determine an electromagnetic fingerprint on an enclosure in order to distinguish a computer that is off versus one that is operating.

A further object of the invention is to enable a system that puts electromagnetic waves inside the object and measures the "wave characteristics" of the object when the object is large compared to the wavelength, and has a sufficiently "irregular" interior open space.

The various features of novelty that characterize the invention will be pointed out with particularity in the claims of this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features, aspects, and advantages of the present invention are considered in more detail, in relation to the following description of embodiments thereof and in relation to the accompanying drawing, in which:

FIG. 20 shows an electromagnetic fingerprint of the laptop computer of FIG. 18 with the computer turned on.

DESCRIPTION OF EXEMPLARY EMBODIMENTS

Figure 1:
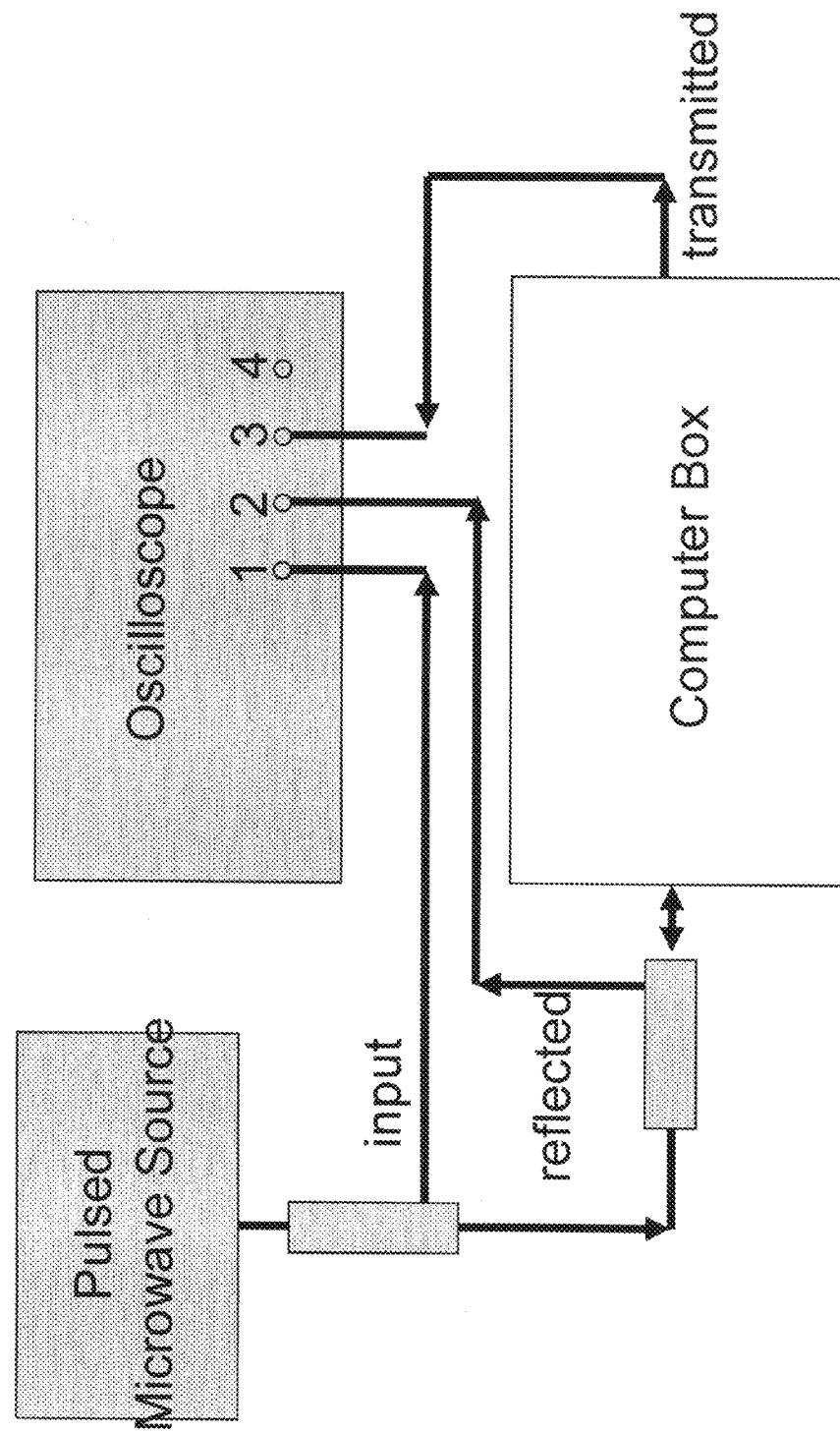
FIG. 1 illustrates a schematic of direct-injection studies according to the present invention.

The invention summarized above and defined by the enumerated claims may be better understood by referring to the following description, which should be read in conjunction with the accompanying drawing. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

In a preferred, exemplary embodiment of a system of the current invention, a waveform fingerprint system for an object includes a waveform generator operationally connected with an object and a receiver. The generator produces and injects a waveform/frequency/signal into the object and the receiver collects the signal after its transmission through the object. The collection of this "transmitted" waveform/signal/frequency allows the generation of a waveform fingerprint for the object.

The system generates this unique fingerprint/identifier/signature of the object for the purpose of providing a perceptible display. As will be further described below, the fingerprint is generated by calculations involving the use of the in-phase and quadrature components of the waveform. The display may be perceived in numerous ways, such as a visual display, audible display, tactile display, and any other sensory display methodologies that may be available. Many of the drawing figures of the current application provide a visual representation of a plotting upon a two dimensional graph of the unique fingerprints generated using the methods of the current invention. Further, these figures are enhanced through the use of color to distinguish the various embodiments ("before" and "after") of the object. It is contemplated that the types of perceptible displays, such as the visual representations provided herein, may be provided through the use of and upon various technology, equipment, and media. Thus, the current invention should not be read as limited to a drawing upon a sheet of paper as the current invention contemplates and intends to have fall within its scope all forms of display of the novel results achieved through use of its novel system and methods.

The waveform generator or source may provide and produce various types of waveform/signal output or emission at various frequencies, such as electromagnetic, microwave, acoustic, or quantum mechanical waveforms. For the electromagnetic case, frequencies ranging from Megahertz (MHz) to Gigahertz (GHz), C-band and X-band are contemplated as within the scope of the current invention. It is understood that the use of other types of signals and frequencies also would fall within the novel invention presented herein. In operation, the generator may be selected, designed, and/or built to emit a particular type of waveform having a specific, determined frequency or predetermined range of frequencies. For instance, in a preferred embodiment, a generator may have the capability to emit a waveform having a range from megahertz (MHz) through Gigahertz (GHz). This range may allow for refinement, such as for the current invention where it may be more preferable to limit our range between 550 MHz-20 GHz. The current invention was shown (see below) to provide its distinguishable waveform fingerprint capability at further preferred ranges between 1-10 GHZ and was further refined and identified a range of 5-8 GHz, C-band, or X-band emissions that promoted the achievement of desired results. It was also discovered that the current invention methodologies, wherein those methodologies were performed by using the waveform frequency emitted by the generator in incrementally increasing steps, it promoted the achievement of stable and predictable results and may allow for the prediction of the use of other waveforms and frequencies. The current invention preferably utilized incremental steps ranging from 0.01-1 GHz, more preferably 0.04-0.07 GHz, within the predetermined range of frequencies. Thus, as further described below, the achievement of the fingerprinting by the current invention is a function of collecting various data points regarding signal leakage collected from a predetermined range of frequencies to be employed over a predetermined period of time for waveform injection into an object.

The system of the current invention thus directly contemplates the use of waveform emission time periods, which may typically range from 1 nanosecond (ns) to 150 ns, more preferably 40 ns-120 ns. Alternative time periods and/or the absence of the use of time periods do not fall outside the scope of the current invention. It may also be understood from the disclosure provided herein that the waveform emitted by the generator may preferably have a wavelength, or based upon the predetermined range of frequencies to be employed for a particular object analysis, a series of wavelengths covering the entire analysis time period, that may preferably be less than the dimensions of the object. In preferred embodiments, the wavelength is less than the structural dimensions of the object in order to promote the propagation and resonation of the signal once inside the object.

The object may be a construct of various type and dimensional structure. While a few structural features, such as an injection site for the injection of the waveform frequency and a signal "leak" point or "leakage" site may be preferred, the current invention should not be read as being limited to requiring such features in order to provide its unique advantages. It is preferred that the object have sufficient dimensions in order to allow it to provide an enclosure or enclosed space within its interior. Further, it is preferable if included within the enclosure are one or more, various radiative impediments, as are clearly shown in the drawing figures. These impediments and their orientation, as will be explained, play a large role in the current invention's methodologies for generating its unique fingerprint. In many of the embodiments and drawing figures of the instant specification, it may be seen that the object is a "commonly" used or visually identifiable as a computer, in desktop or laptop form. While these objects did serve useful purposes for the current invention, they should not be interpreted to define the full scope of the invention disclosed herein. For instance, the use of the current invention techniques and methodologies may find application with nearly any "black box" situation, where simple visual perception does not reveal any information regarding the nature of the "box", particularly as it may be identified by its interior contents if it were known in some manner. Thus, the current invention may provide a practically applicable solution to such a problem.

Another feature of the object that may play a large role in the performance of the current invention and identification of a unique fingerprint is the material composition of the object. For example, the casing that houses the radiation impediments and defines the enclosure within the object may be constructed of a material or materials that may promote at least some improved resonating/propagating characteristics for a waveform. For instance, material(s) employed may include metals and other hard/hardened materials, such as possibly some plastics or various composites and/or polymers. The particular type of material(s) used in constructing the object preferably may avoid including component features that may have increased dampener/impediment characteristics, in their own right. However, it is contemplated that the current invention may be used with any types of material (s) and provides a unique signature for almost any type of object. Where an object allows radiation leakage, the current invention may be able to turn that heretofore unused activity into a useful construct by generating a waveform fingerprint.

The receiver, which collects the transmitted waveform after it has passed through the object, may include or be configured in various channel and/or multi-channel input capability forms. These input channels provide the receiver with the capability to collect or receive at least one of the waveforms being transmitted through the object. Receiving the waveforms only after they have been transmitted through the object, meaning through the casing of the housing and having had a chance to interact with the enclosure and any items within the interior of the object, is a form of indirect transmission of these waveforms from the waveform generator. It is contemplated, as shown and described below, that the receiver may receive direct transmissions of the waveforms from the source and/or may receive the waveforms only after they have passed through any number of additional components within the fingerprint system of the current invention. Collection of signals only after having passed through various system components, in addition to the object, may be interpreted as the receiver collecting/receiving intermediate signals from or through the system of the current invention. Another methodology fully disclosed herein below is that the receiver is capable of collecting a signal both when in close physical proximity (e.g., physically attached to) and when physically separated from and/or physically located remotely when looked at in comparison to the position of the object or any of the other components of the system of the current invention. Thus, the receiver is capable of collecting remote signal(s). Whether direct, intermediate or remote, the receiver of the current invention is capable of collecting various waveform frequencies and types of waveforms, such as those described above.

It should be understood that the waveform generator, object or receiver, as described, may be operationally connected in various configurations within the systems of the current invention to the various system components, such as the coupling devices, oscillators, synthesizers, phase discriminators, mixers, amplifiers, filters, and the like as may be further contemplated by those of ordinary skill in the art. The system contemplated that where the operational connection of system components is at least one of a direct connection or a remote connection and wherein the remote operational connection of system components spaces the components at physical distances relative to one another that range from millimeters to feet and more preferably 3.3 centimeters to 2 feet. These ranges are not intended to be limiting but merely providing exemplary, concrete language for providing certain, preferred embodiments of the current invention.

The system, including the performance of the methodologies by or within the systems of the current invention, may be performed through the manual arrangement and application of system components. Such manual control may be supplemented, significantly replaced, or completely eliminated as a requirement for the performance of the methods using the systems of the current invention by implementation of automatic control mechanisms. Automation contemplated may include the use of computer controlled machines that execute the necessary steps of the methods for achieving the results of the current invention. Perhaps, such automation may be extended to the design and construction of the experimental conditions themselves either separately or in addition to the experimental protocol control capability. Thus, the steps presented in the methods of the current invention should be understood as being capable of being implemented in various formats, such as in a computer executable program format, wherein the system of the current invention or at least some part of the execution of the methods of the current invention and thus, the system is at least somewhat automatically controlled and/or controllable.

Figure 2:
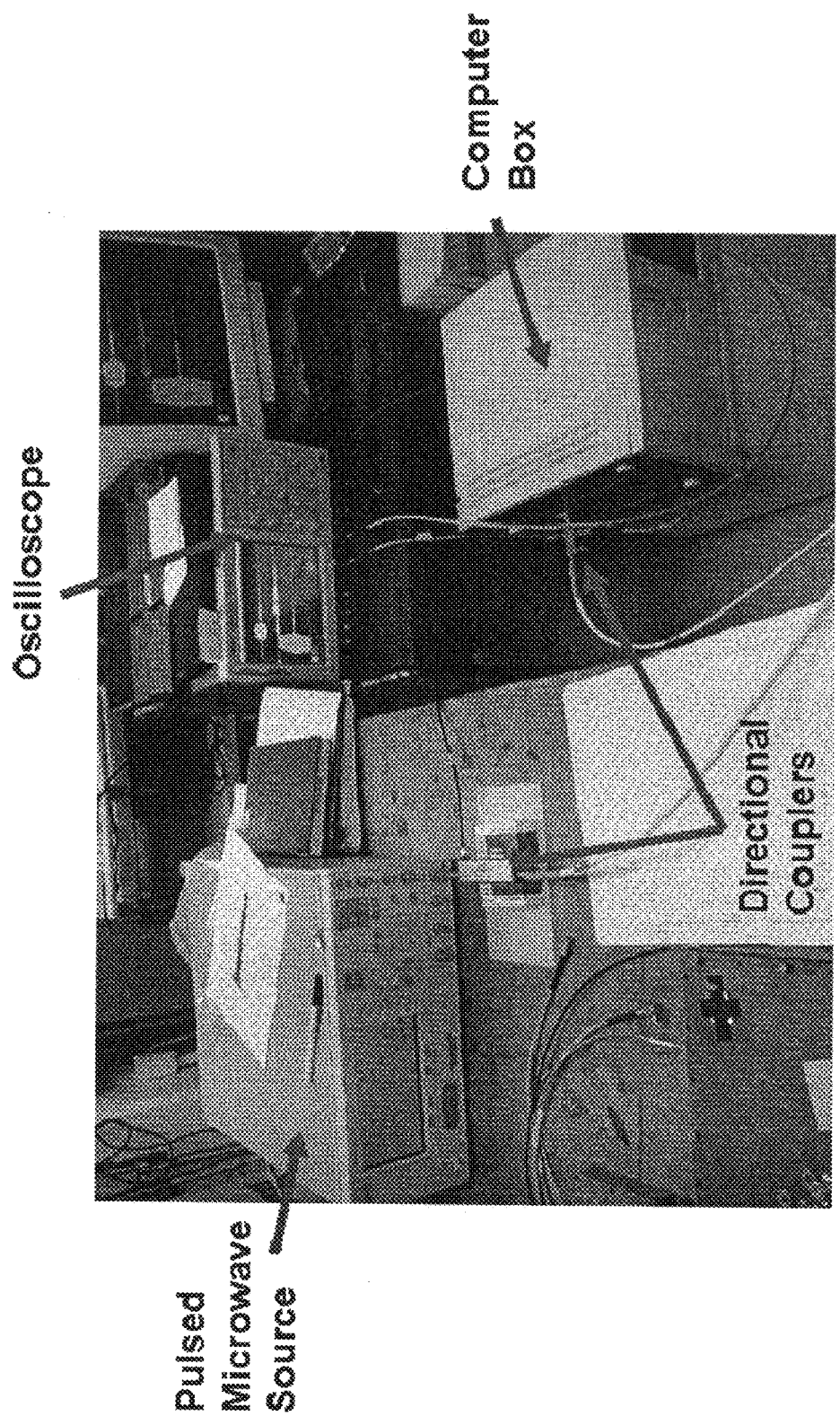
FIG. 2 shows a set-up for direct-injection into a computer box according to the present invention.

The model on which the invention is based is shown in FIGS. 1 and 2. FIG. 1 shows a schematic of direct-injection studies of time-domain RF signatures of a computer box. The schematic includes a pulsed microwave source, such as an Agilent E8257C and a multichannel oscilloscope, such as a Tektronix TDS6804B. The microwave signal may be connected to the computer box through directional couplers, such as Krytar model 1520. Of course, other equipment can be used. In the specific embodiment described herein, the computer box has outer dimensions of 15.5" high, 18" deep, and 8.5" wide. Other sizes of enclosure can be measured provided that the object is large compared to the wavelength of the signal, and has a sufficiently "irregular" interior open space.

Figure 3:
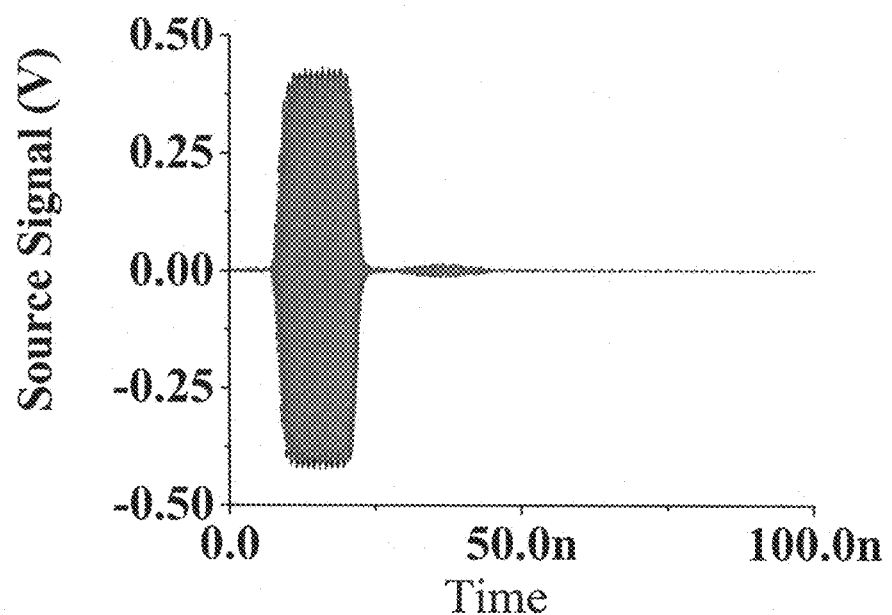
FIG. 3 shows a driving signal waveform according to the present invention.

Direct injection studies were used to gain a basic understanding the main physics of RF signatures of computer boxes. A pulsed microwave source provides a signal at a fixed carrier frequency ($f_c$) that is amplitude modulated as a pulse with durations ranging from 10 ns to 100 ns (see FIG. 3). The signal is injected into and extracted from the computer box through short dipole antennas embedded in the walls of the computer box. A part of the input signal is extracted to trigger the oscilloscope (channel 1), while the reflected waveform (channel 2) and transmitted waveform (channel 3) are also collected on the oscilloscope. An example of a driving microwave signal is shown in FIG. 3. The driving pulse in this case is about 12 ns long. The carrier signal frequency $f_c$=7.0 GHz, +25 dBm output, with 120 ns repetition period.

Figure 4:
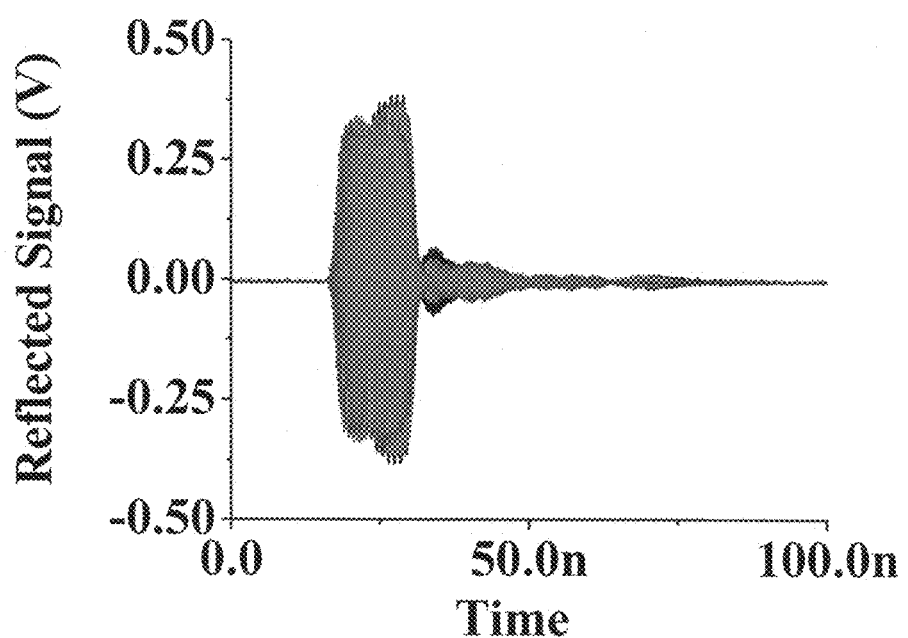
FIG. 4 shows a reflected signal waveform according to the present invention.

The reflected signal recorded in channel 2 of the oscilloscope is shown in FIG. 4. The red and black traces indicate reproducibility tests, while the green trace shows the response after the AGP video card has been moved.

Figure 5:
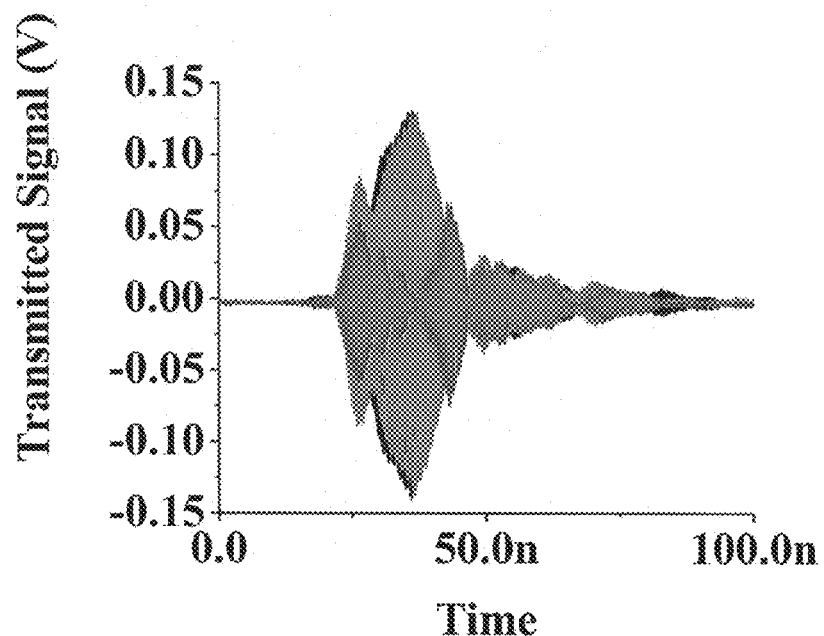
FIG. 5 shows a transmitted signal waveform according to the present invention.

The transmitted signal recorded in channel 3 of the oscilloscope is shown in FIG. 5. Again, the red and black traces indicate reproducibility tests, while the green trace shows the response after the AGP video card has been moved.

An experiment was first done to test the reproducibility of the measured signals. The reflected and transmitted pulses were measured for the computer box; the cover was then removed and replaced, changing nothing inside the box. The signals were re-measured and were found to be almost identical to those measured initially (compare the red and black traces in FIGS. 3-5).

Figure 6:
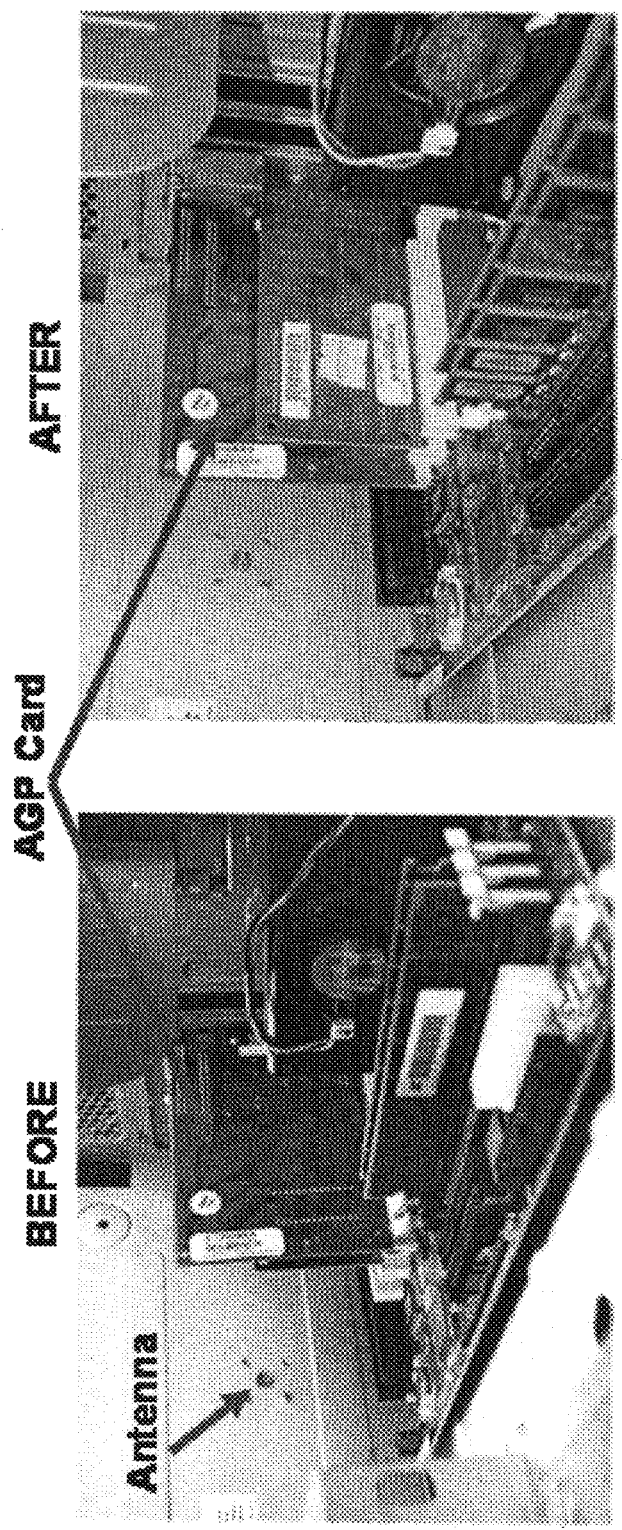
FIG. 6 shows a computer box interior with cards in different positions.

FIG. 6 shows the interior of the computer box. On the left of the illustration (labeled "before"), an AGP video card is installed in slot 5; on the right of the illustration (labeled "after"), the AGP video card is installed in slot 3. AS is known in the art, the slots are numbered as follows: the two black slots near the far wall are slots 1 and 2, while the white slots are numbered 3-6. The numbers increase upon moving away from the far wall. Also shown in FIG. 6 is a direct-injection short-dipole antenna.

To establish that different computers should have different signatures in their reflected and transmitted RF signatures, the computer box was opened again and the position of the AGP video card was changed from slot 5 to slot 3. The AGP card was moved two slots, to the opposite side of the Ethernet card, as shown in before-and-after cases in FIG. 6.

The red traces in FIGS. 4 and 5 show the response of the computer box in the "before" case, with the AGP card in slot 5. The RF signature is referred to as a "coda" because it embodies and codifies the complicated interior structure of the computer box. The green traces in FIGS. 4 and 5 show the reflected and transmitted coda in the "after" case, with the AGP card in slot 3, as shown on the right side of FIG. 6. The distinct differences in coda, particularly in transmission, demonstrate the principle that computer boxes with slightly different interior configurations have measurably different RF signatures.

Smallest Measurable Change

There is a lower limit for the smallest detectable change that can be measured using signals similar to those in FIGS. 4 and 5. Note the memory chips in the foreground of FIG. 6. One of these memory chips was "leapfrogged" over the other one into an empty slot. Measurements were taken of the reflected and transmitted pulses from the computer box with the memory chip in these two locations, similar to the data in FIGS. 4 and 5. Small changes were noted in the coda, mainly in the transmitted response. However, these changes are on the order of the noise level (signal-to-noise approximately 1). This establishes an estimated lower limit on the present technique to measure small changes.

Observations from the Direct-Injection Studies

Figure 7:
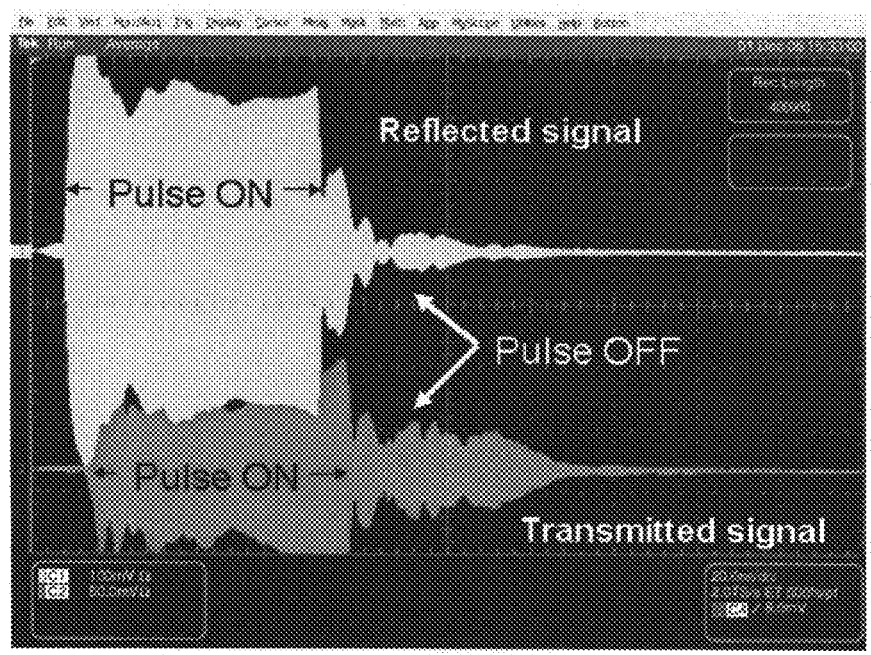
FIG. 7 shows direct-injection measured reflection and transmission RF signatures from the computer box of FIG. 6.

While performing direct-injection studies, a number of systematic and important properties of the RF signatures created by the computers can be noted.

i) First, the variation in RF signatures between different internal configurations of the computer boxes is most notable during the time when the pulse is applied (see FIG. 7). (Nevertheless, significant differences are also seen after the pulse is turned off and the signals are "leaking out" of the computers.) This result suggests that "short periodic orbits" (SPOs) and simple processes involving zero or one reflection before the signal leaves the enclosure are useful for characterizing the object.

FIG. 7 shows the direct-injection measured transmission (blue) and reflection (yellow) RF signatures from the computer box. In this case, the carrier frequency is 7 GHz, with 60 ns duration pulse, and +24-dBm input. Note that the transmitted signal travels a greater distance to the oscilloscope, hence is delayed compared to the reflected signal.

ii) Similarly, FIG. 5 shows that the signal created during the pulse is altered significantly by moving the position of the internal boards, while the signal after the pulse turns off is not dramatically different for the two cases. While the pulse is on, the dynamics depend on the impedance of the box, which is a rapidly oscillating function of frequency. After the pulse turns off, many modes of the box have been excited, and the coda reflects the average decay properties of the box, and is not as sensitive to small details in the enclosure.

iii) Third, the RF signature differences are more clearly recognized for longer duration pulses, up to a limit. In the case of the computer box, the limit is about 40 ns.

iv) Fourth, the RF signature for a given computer box shows considerable variation with driving carrier frequency. This is expected because the box is excited with a number of resonances centered on the carrier frequency. Hence, by changing this center frequency one establishes different types of excitations in the box and this provides further unique information about the internal constitution of the enclosure.

v) Fifth, in cases where the input coupling to the computer structure is poor, most of the input signal is reflected, and the reflected signal carries relatively little information about the interior structure.

Electromagnetic Fingerprint

These observations suggested a method to identify computers uniquely. A composite frequency/time RF fingerprint can be created of the object. The object is stimulated by a sufficiently long pulse of a given carrier frequency and the reflected and transmitted signals are recorded. The carrier frequency is chosen so that many wavelengths at the selected frequency span a typical dimension of the computer box (i.e. the box is overmoded). The carrier frequency is then changed by some increment and the experiment is repeated. This process continues over a large range of carrier frequencies so that a variety of coupling conditions are sampled and the interior of the computer is thoroughly characterized. The result is a unique 3-dimensional data set that is a combination of the intrinsic properties of the box convolved with the properties of the coupling structures. The coupling structures can be separately characterized through radiation impedance measurements. With this, one can then de-convolve the intrinsic properties of the box and then calculate what its fingerprint would look like when measured through other coupling structures or conditions.

Figure 8:
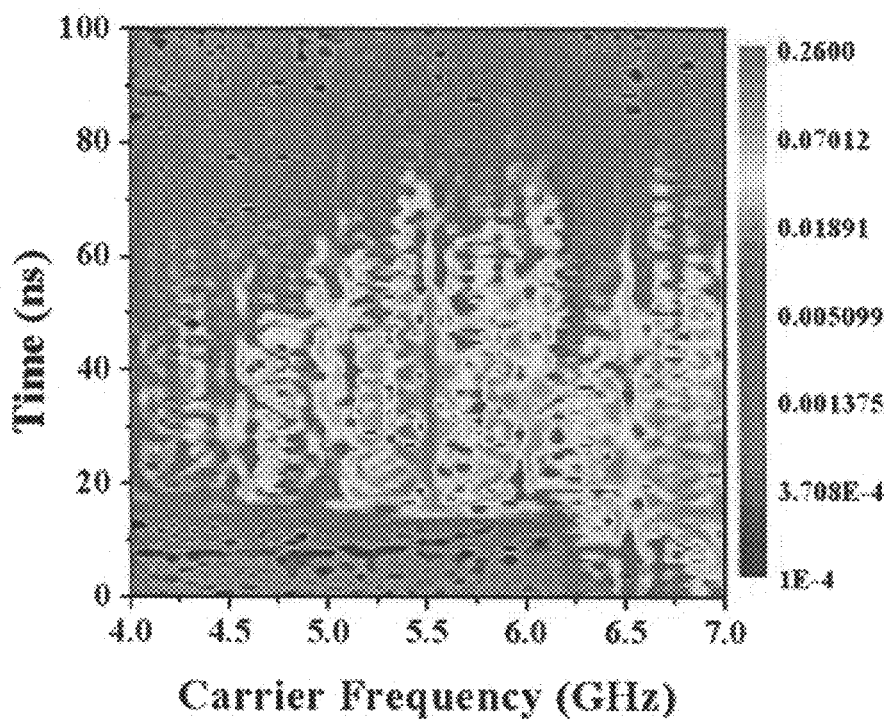
FIG. 8 shows an electromagnetic fingerprint of the computer box of FIG. 6 with the AGP card in slot 5.

An Electromagnetic Fingerprint (EMF) made of the computer box is shown in FIG. 8. In this example, the AGP card is in slot 5 (see FIG. 6). The computer box was stimulated with 30-ns-long pulses of various carrier frequencies between 4.0 and 7.0 GHz in steps of 0.05 GHz. The signals are coupled in and out by short dipole antennas. The transmitted signal was measured as a function of time $V_{Trans}(t)$. The horizontal axis is the carrier frequency of the applied 30 ns-long +24 dBm input pulse, while the vertical axis is time. The colors in FIG. 8 represent the logarithm of the absolute transmitted voltage $Log_{10}(|V_{Trans}(t)|)$ for the set of resulting coda, with a scale shown on the right (red represents large signal, while blue represents small). The pulse repetition period is 1 µs, each waveform averaged 50 times, and the signals are coupled in and out through short dipole antennas on the walls of the computer box. In this case, the transmitted pulse arrived at the oscilloscope at approximately 17 ns (the driving pulse arrived at 0 ns). The arrangement of colors in this plot is unique to the interior structure of the computer box.

Analysis of the EMF Patterns

Figure 9:
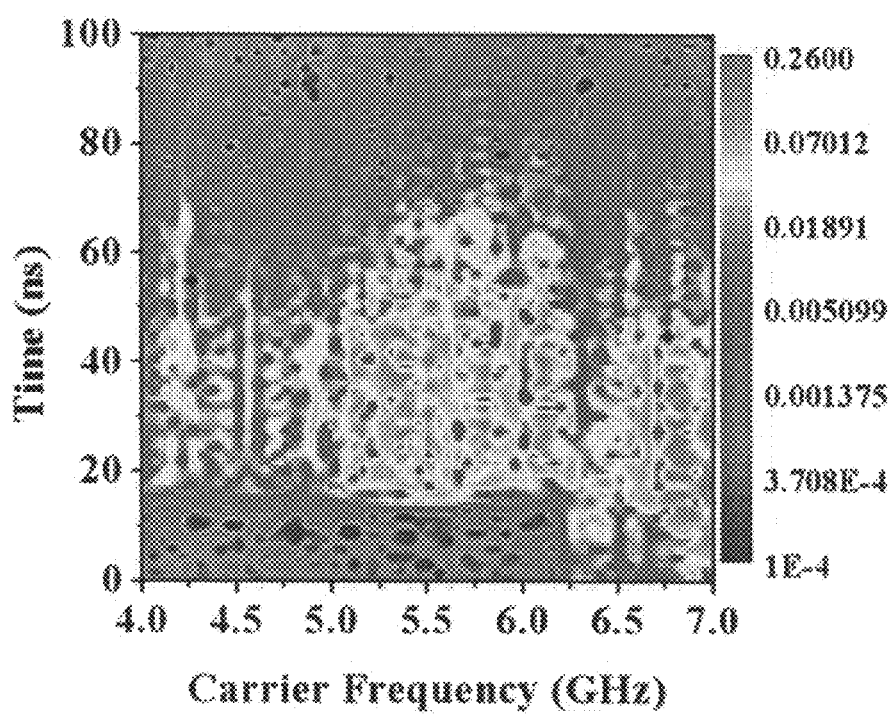
FIG. 9 shows an electromagnetic fingerprint of the computer box of FIG. 6 with the AGP card in slot 3.

To test the uniqueness of the EMF, the computer box was opened and the AGP card was moved from slot 5 (FIG. 6 (before)) to slot 3 as shown in FIG. 6 (after). The EMF was then re-measured, and the result is shown for comparison in FIG. 9. There are many small but noticeable differences between the "before" and "after" EMFs. To quantify the differences, a two-dimensional correlation was carried out between these two images. The images are represented as M×N matrices A and B, respectively. The cross-correlation r between the two images is defined as:

$$r = \frac{\sum_{m=1}^{M}\sum_{n=1}^{N}(A_{mn}-\overline{A})(B_{mn}-\overline{B})}{\sqrt{\sum_{m=1}^{M}\sum_{n=1}^{N}(A_{mn}-\overline{A})^2 \sum_{m=1}^{M}\sum_{n=1}^{N}(B_{mn}-\overline{B})^2}}$$

where $\overline{A}$ and $\overline{B}$ are the mean values of the images. The cross-correlation of the two images in FIG. 9 is r=0.66, while their individual auto-correlations are 1.00. This demonstrates that the EMF can distinguish a difference in internal structure of two very similar computer boxes.

A Different Type of Direct Injection

Figure 10:
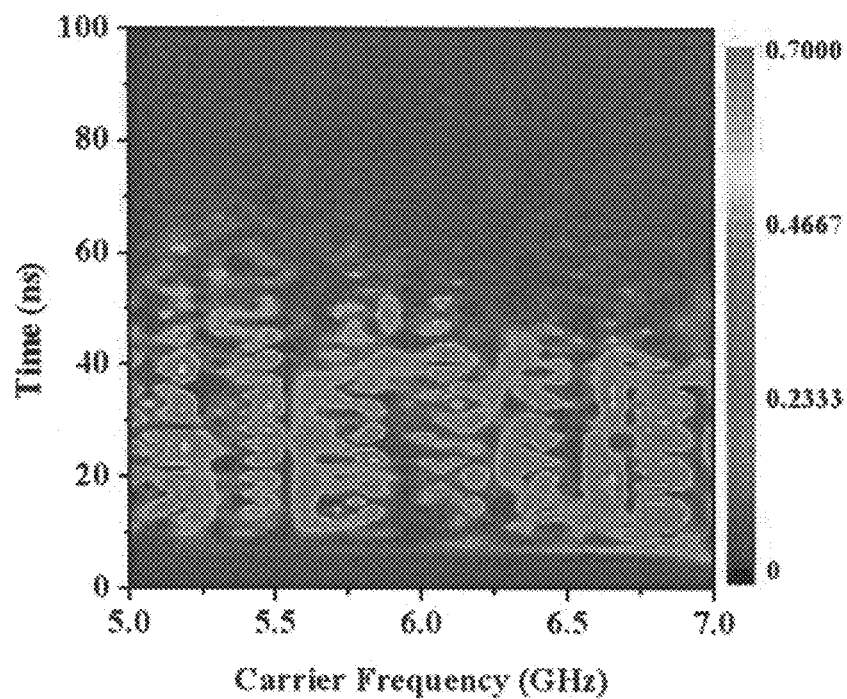
FIG. 10 shows an electromagnetic fingerprint generated with direct-injection through a coaxial-to-waveguide adapter into the computer box of FIG. 6 with the AGP card in slot 3.
Figure 11:
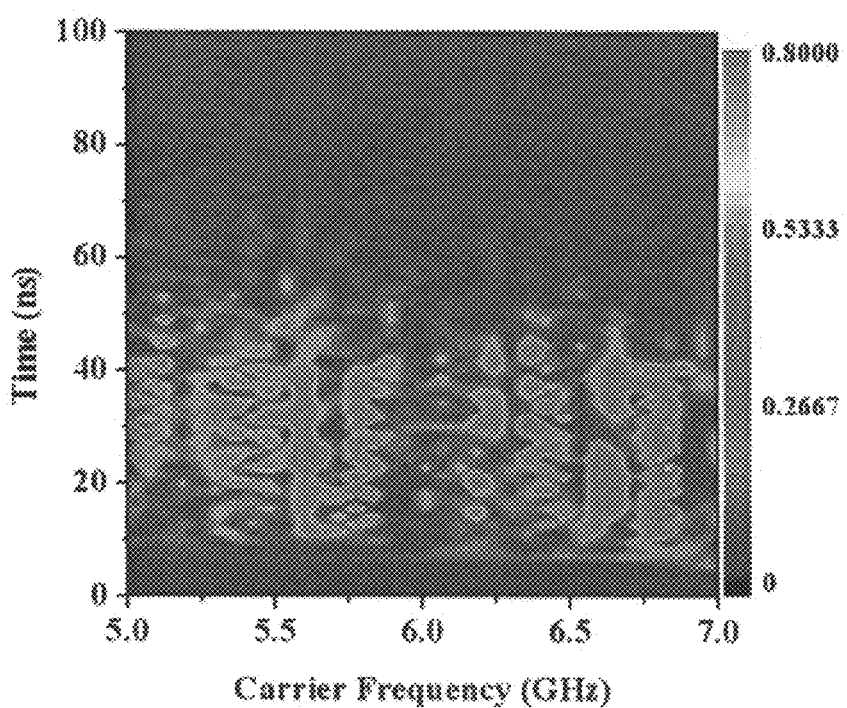
FIG. 11 shows an electromagnetic fingerprint generated with direct-injection through a coaxial-to-waveguide adapter into the computer box of FIG. 6 with the AGP card in slot 5.

Further testing was performed with the dipole antennas replaced with two C-band coaxial-to-waveguide adapters. A rectangular hole was cut in the metallic wall of the computer box matching the dimensions of the C-band waveguide. The EMFs were then measured for carrier frequencies between 5.0 and 7.0 GHz for the two cases discussed above (AGP card in slots 3 and 5). FIG. 10 shows the EMF of the computer box generated with direct-injection through C-band coaxial-to-waveguide adapters into the computer box with the AGP card in slot 3. FIG. 11 shows the EMF of the computer box generated with direct-injection through C-band coaxial-to-waveguide adapters into the computer box with the AGP card in slot 5. In both cases, the signal used 30 ns pulse width, 1 ms pulse period, +24 dBm input power, 100 averages, carrier frequency step size 0.06 GHz. Note that these EMFs are presented on a linear scale, rather than the log scale shown in FIGS. 8 and 9. This is one reason why the EMFs look so different. Another reason is the change in coupling method and location, which convolves the intrinsic EMF of the box with a different coupling radiation impedance.

The two images have a cross correlation of r=0.66, the same as that found with the short dipole antennas. The cross correlation of EMFs is independent of the details of the direct injection method. This implies that the cross-correlation of the EMFs is a robust and universal method to determine the differences between computer boxes.

Signal Analysis of Coda

The data are direct digitized signals from an 8 GHz analog bandwidth oscilloscope and have an equivalent-time sampling rate of 2 THz. The actual information coming from the computer box is in the form of an "envelope" on the fast carrier signal, which modulates on the ns time scale, or longer. Hence, it is more efficient to strip-off the carrier signal and only look at the envelope function, since this is the true signal that encodes information about the computer box.

One way to do this is to express the signal in terms of its In-phase (I) and Quadrature (Q) components with respect to a phase-coherent signal at the carrier frequency. This process is known as I/Q demodulation. This can be seen through the following equation;

$$s(t)=a(t)\cos[2\pi f_c t+\phi(t)]=a(t)\cos[\phi(t)]\cos[2\pi f_c t]-a(t)\sin[\phi(t)]\sin[2\pi f_c t],$$

where s(t) is the signal, being made up of a slowly varying amplitude envelope a(t) and a slowly varying phase part φ(t), where "slow" means with respect to the carrier period $1/f_c$. The signal decomposes into an In-phase part $I(t)=a(t)\cos[\phi(t)]$ multiplying $\cos[2\pi f_c t]$ and a Quadrature part $Q(t)=-a(t)\sin[\phi(t)]$ multiplying $\sin[2\pi f_c t]$. The I and Q signals are now at baseband and have much smaller bandwidth than the carrier frequency (in our case roughly $1/100^{th}$ of the bandwidth), yet contain all of the information required for measurement purposes. One can extract the I and Q signals from the EMFs numerically in MatLab, for example. However, this still involves measuring very large data sets and manipulating them with the computer. It would be much easier to directly measure only the I and Q components and never have to deal with the high frequency signals.

Direct Measurement of Coda and EMFS at Baseband

Figure 12:
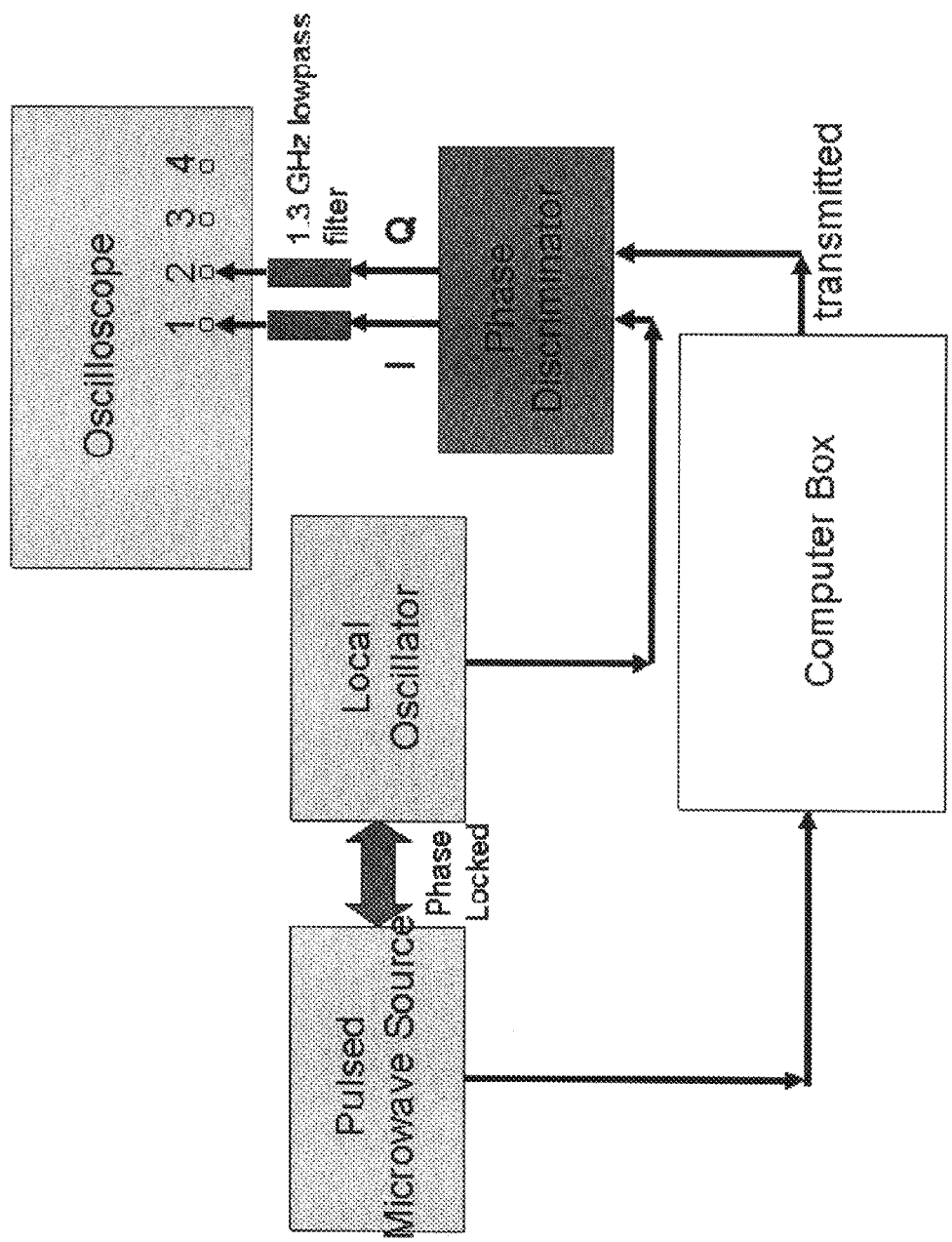
FIG. 12 illustrates a schematic of the electromagnetic fingerprint measurement of the computer box of FIG. 6 using a phase discriminator according to the present invention.

FIG. 12 shows a schematic of the EMF measurement of the computer box using a phase discriminator to measure the transmitted signal I and Q coda at baseband. A pulsed signal is sent through the computer box, and the transmitted signal is sent to a phase discriminator. The other signal entering the discriminator is a CW signal at the same carrier frequency, supplied by a synthesizer, such as an HP 83620B, that is phase-locked to the pulsed source. A phase discriminator, such as an Anaren 20757, measures the degree to which the two signals are in-phase (I output) and in quadrature (Q output) as a function of time. It effectively translates the coda signal from a modulation of the carrier signal to simply a modulation signal at baseband. These I and Q signals are low pass filtered and then recorded in the oscilloscope. The recorded signals contain up to about 500 MHz to 1 GHz of bandwidth, and represent the "essence" of the coda. As such, they can be digitized into much smaller data sets.

Figure 13:
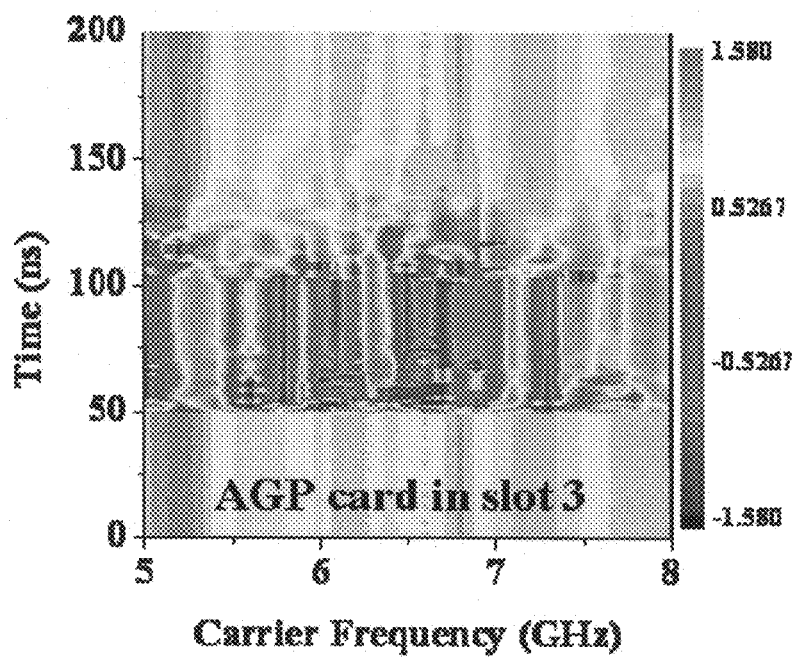
FIG. 13 shows an electromagnetic fingerprint of the computer box of FIG. 6 with the AGP card in slot 3.
Figure 14:
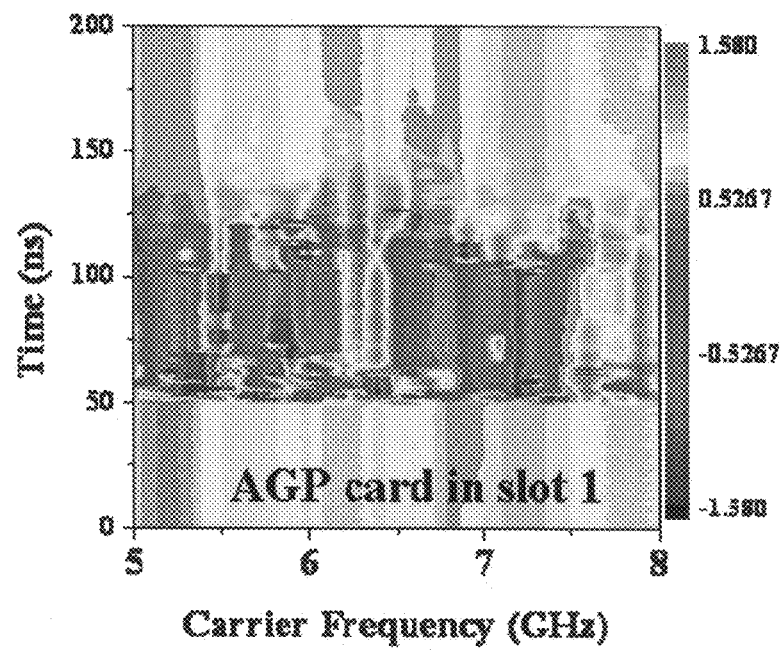
FIG. 14 shows an electromagnetic fingerprint of the computer box of FIG. 6 with the AGP card in slot 1.

The resulting baseband EMF for the computer box with the AGP card in slot 3 is shown in FIG. 13 and the baseband EMF for the computer box with the AGP card in slot 1 is shown in FIG. 14. In both cases, the baseband EMF measurements of the computer box is conducted with direct injection through 2 C-band coaxial-to-waveguide couplers with carrier frequencies from 5 to 8 GHz in steps of 0.1 GHz, with +24 dBm 50 ns pulses with a pulse period of 1 ms, and +8 dBm local oscillator power. The EMF is shown in the form of an I/Q phase angle $\tan^{-1}(Q(t)/I(t))$, where I(t) and Q(t) are the in-phase and quadrature signals from the computer box. The colors represent values of $\tan^{-1}(Q(t)/I(t))$ in the transmitted signal through the box, ranging from $+\pi/2$ (red) to $-\pi/2$ (blue). The data sets show clear differences resulting from the change in position of the card. The cross correlation between these images is only r=0.32, showing that this is a more sensitive measure of the EMF than the direct method presented above. However, when the card was replaced in its original location, the correlation of the results for two identical computers was only r=0.35, suggesting that this correlation method may still be too sensitive, or sensitive to the wrong aspects of the signal. It was found from real-time measurements that the phase of the I/Q response is extremely sensitive to many details, such as mechanical load on the enclosure, small perturbations to the walls of the computer box, etc. In an alternative embodiment, it is possible to examine the magnitude of the I/Q response $\sqrt{I^2+Q^2}$ versus time, rather than the phase. This quantity may have the correct degree of sensitivity to important details and be less sensitive to trivial differences than the phase.

Measurement of Coda with One Remote Antenna

Figure 15:
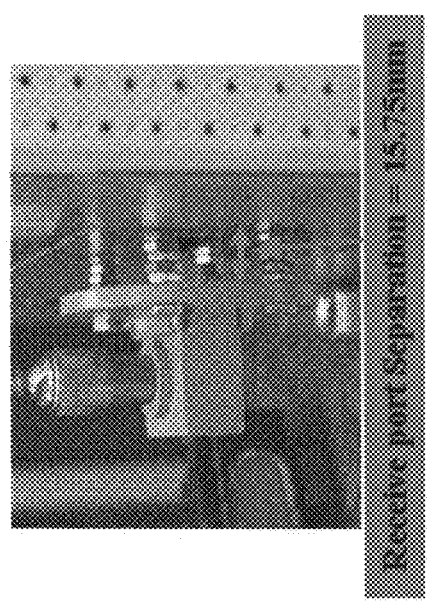
FIG. 15 shows a coupler separated from the computer box of FIG. 6 according to the present invention.

In a refinement to measure EMFs for remote identification of a computer, a pulsed microwave signal is injected directly into the computer box as before with the measured signal taken at some "remote" distance from the computer box. As shown in FIG. 15, the receiver is a C-band coaxial-to-waveguide adapter held approximately 16 mm away from an opening in the side of the computer box. A clear EMF was measured in this case, with no additional equipment required.

Figure 16:
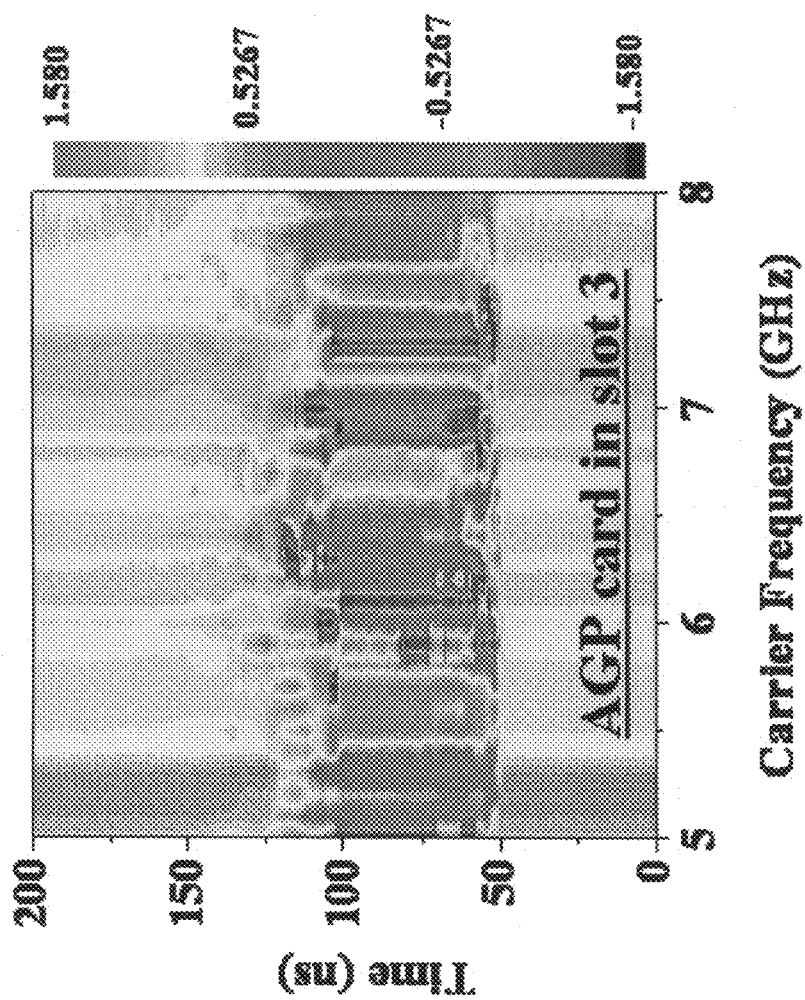
FIG. 16 shows an electromagnetic fingerprint of the computer box using the remote coupler of FIG. 15.

FIG. 16 shows a baseband EMF measurement [$\tan^{-1}(Q(t)/I(t))$] of the computer box with direct injection and the "remote" receiver. In this case, the carrier frequencies range from 5-8 GHz in steps of 0.1 GHz, with +24 dBm pulses, 50 ns long, and 5 µs period, using the local oscillator +8 dBm and phase-locked.

Measurement of Coda with Two Remote Antennas

In a further refinement, the driving antenna is moved to a location 16 mm away from the computer box wall and repeated the EMF fingerprint I/Q decomposition measurements using both the driving and receiving antennas away from the computer box wall. The results are shown in FIG. 17, where we again see a clear EMF. Note that the EMF is similar to that shown in FIG. 16, but has a number of differences in detail. This suggests that the details of coupling are playing a role in the EMFs.

Figure 17:
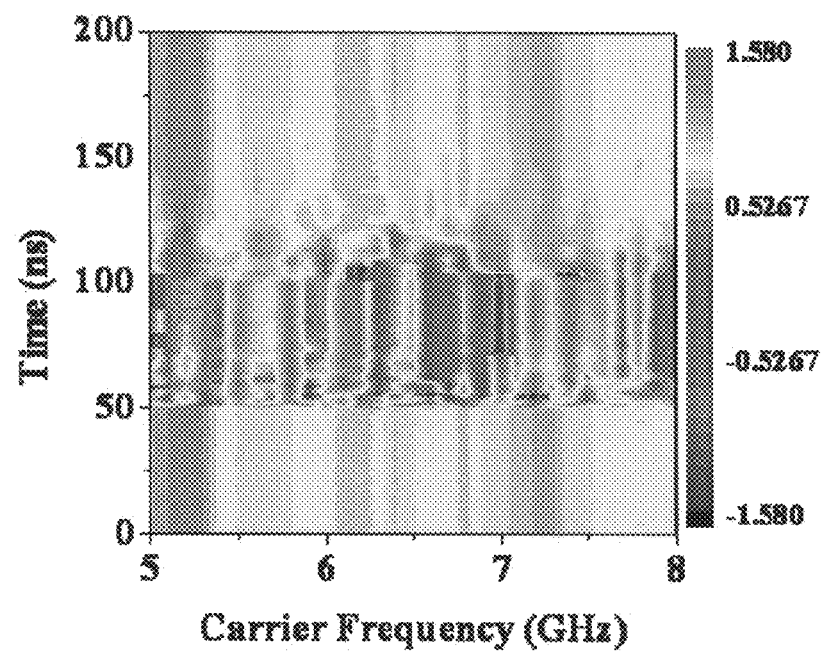
FIG. 17 shows an electromagnetic fingerprint of the computer box using remote injection and remote receiver.

The EMF of FIG. 17 is created by carrier frequencies range from 5-8 GHz in steps of 0.1 GHz, with +24 dBm pulses, 50 ns long, and 5 µs period, using the local oscillator +8 dBm and phase-locked.

EMF Measurements on a Laptop Computer

To test the generality of the EMF concept, a fully operational Gateway Solo laptop computer was used for further EMF studies. The laptop was treated like the computer box above (FIGS. 2 and 12). A signal was direct injected with a small dipole antenna in the PCMCIA slot, and the transmitted signal was measured with a fixed small dipole antenna in the CD-ROM drive bay (with the CD tray open), see FIG. 18. The coda were I/Q demodulated as in FIG. 12.

In this case, the coda signals are weaker than in the computer box case because of the smaller volume, lower Q of the enclosure, and the fact that shielding obstructions are more densely packed in this enclosure. In addition, the coda are less detailed because the wavelengths used here are not much smaller than the enclosure size. For example, the high-end frequency is only 8 GHz (wavelength $\lambda$=3.75 cm), while the laptop has dimensions of 28 cm×21 cm×3.9 cm. Nevertheless, a distinct EMF is generated by the laptop. FIG. 19 shows a baseband EMF measurement [$\tan^{-1}(Q(t)/I(t))$] on the Gateway Solo laptop computer as shown in FIG. 18, with the computer off.

Figure 18:
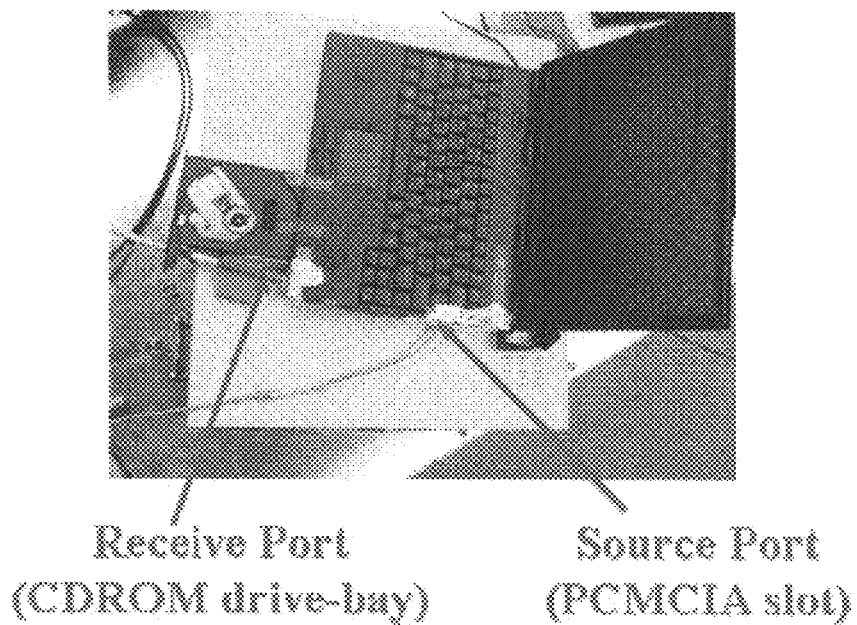
FIG. 18 shows a set-up for direct-injection into a laptop computer according to the present invention.
Figure 19:
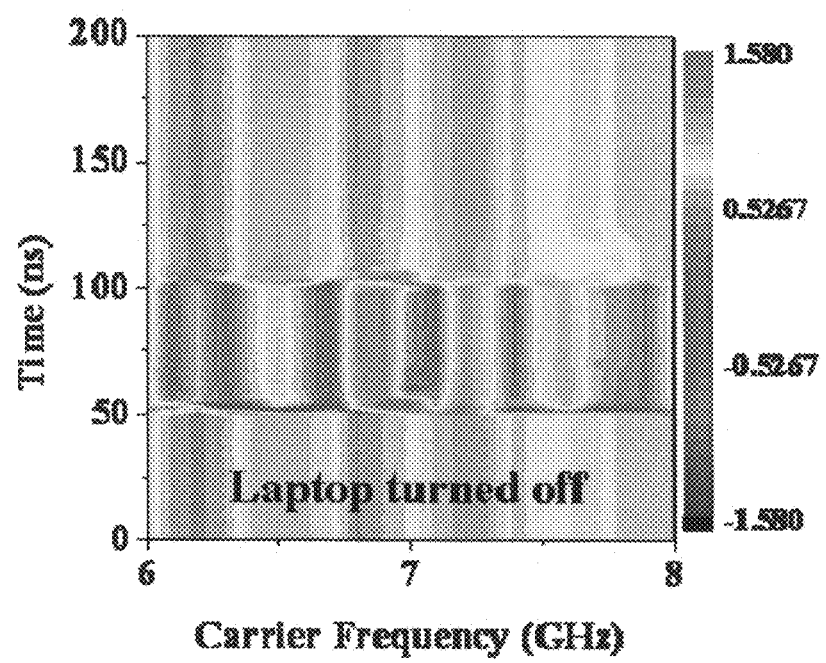
FIG. 19 shows an electromagnetic fingerprint of the laptop computer of FIG. 18 with the computer turned off.
Figure 20:
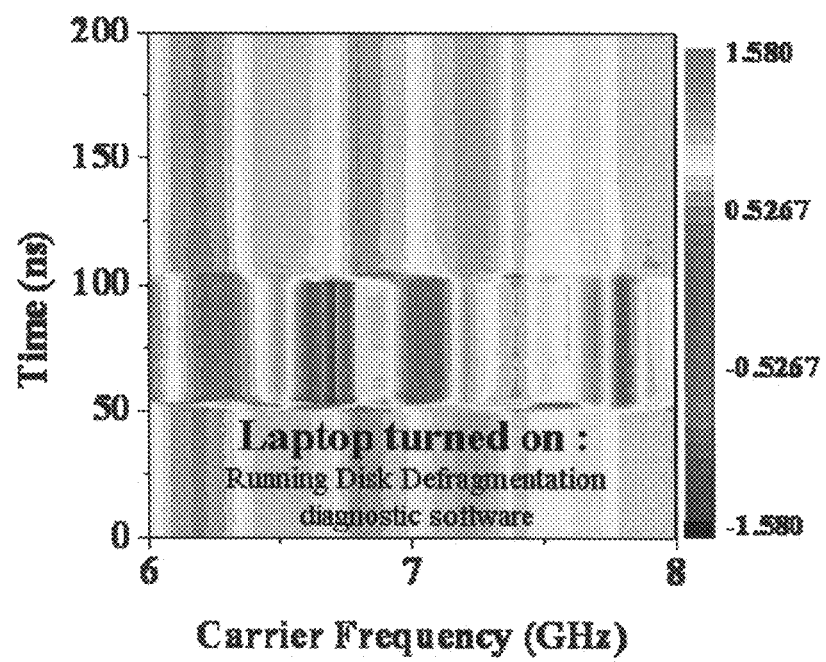

FIG. 20 shows a baseband EMF measurement [$\tan^{-1}(Q(t)/I(t))$] on the Gateway Solo laptop computer as shown in FIG. 18, with the computer on and performing a disk defragmentation diagnostic program. It is interesting to note that the EMF changes significantly between the off and on states of the computer, with a cross-correlation of r=0.67. This demonstrates that it is possible to detect whether or not a computer is running from changes in its EMF. Further, it was also noted that the baseband EMF is modified somewhat when keys on the keyboard are depressed, due to the mechanical deformation of the top surface of the cavity enclosure. These results suggest that EMFs can be useful for monitoring the use of computers, in addition to simply detecting their presence.

The carrier frequencies used to generate FIGS. 19 and 20 range from 6-8 GHz in steps of 0.1 GHz, with +24 dBm pulses, 50 ns long, and 5 µs period, using local oscillator +8 dBm and phase-locked.

Improved Electromagnetic Fingerprinting

Rather than using the "raw" I/Q phase data ($\tan^{-1}(Q(t)/I(t))$, as in FIGS. 13-14, 16-17, and 19-20), a "weighted" and normalized magnitude fingerprint can be calculated. The magnitude I/Q information is weighted by the magnitude data: $m=\sqrt{I^2+Q^2}$. The weighting function is chosen to be $w=(e^x-1)/(e-1)$, where x is the normalized magnitude $x=m/\text{Max}[m]$, and $\text{Max}[m]$ is the maximum over the entire data set. Examples of weighted magnitude fingerprints of the computer box are shown in FIGS. 21 and 22.

In this case, three cards were permuted to different locations: the AGP video card, the Ethernet LAN card, and a (larger) serial I/O card. FIG. 21 shows a weighted magnitude I/Q fingerprints for three cards (AGP, LAN, and Serial) in the computer box in a first configuration. In the first configuration, the I/O card in slot 1, the AGP card is in slot 4, and the LAN card is in slot 5. FIG. 22 shows a weighted magnitude I/Q fingerprints for three cards (AGP, LAN, and Serial) in the computer box in a second configuration. In the second configuration, the I/O card is in slot 2, the AGP card is in slot 6, and the LAN card is in slot 4. In both cases, the wave input is a C-band direct-injection, 50 ns pulse length, 5 ms pulse period, +24 dBm, LO+8 dBm, 0.1 GHz steps, 100 averages.

Figure 21:
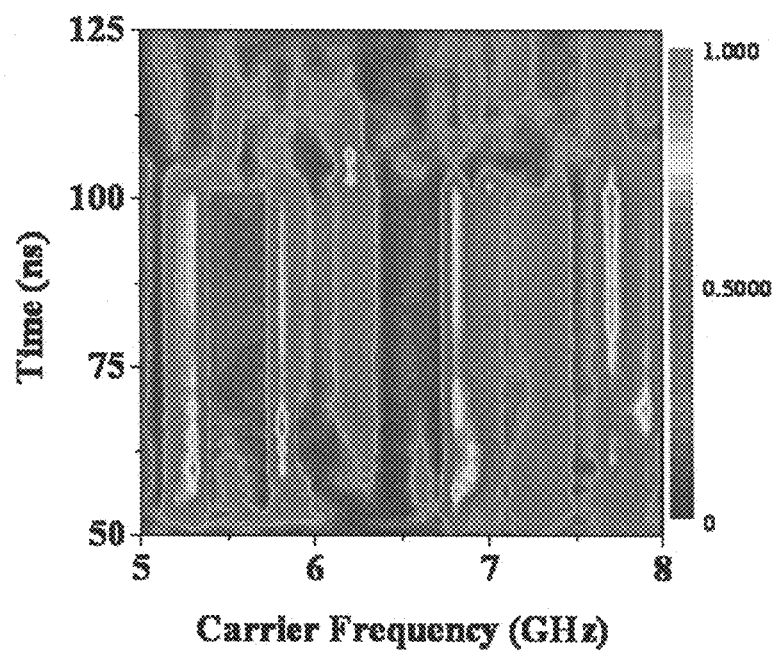
FIG. 21 shows an electromagnetic fingerprint of a computer box with cards arranged in a first configuration.
Figure 22:
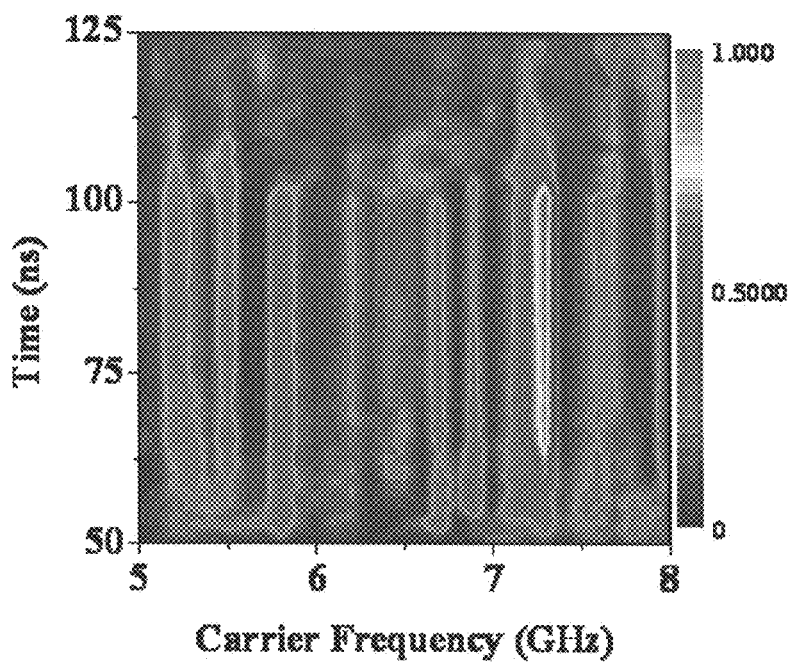
FIG. 22 shows an electromagnetic fingerprint of a computer box with cards arranged in a second configuration.

The cross correlation between the images in FIGS. 21 and 22 is only r=0.17. When the box is re-opened and the cards put back in their original locations, the cross correlation between the initial and final (nominally identical) states is now r=0.48, which is significantly better than the results with I/Q EMFs. Perform General Characterization of the Coupling of Electromagnetic Radiation into Computer Boxes.

Figure 23:
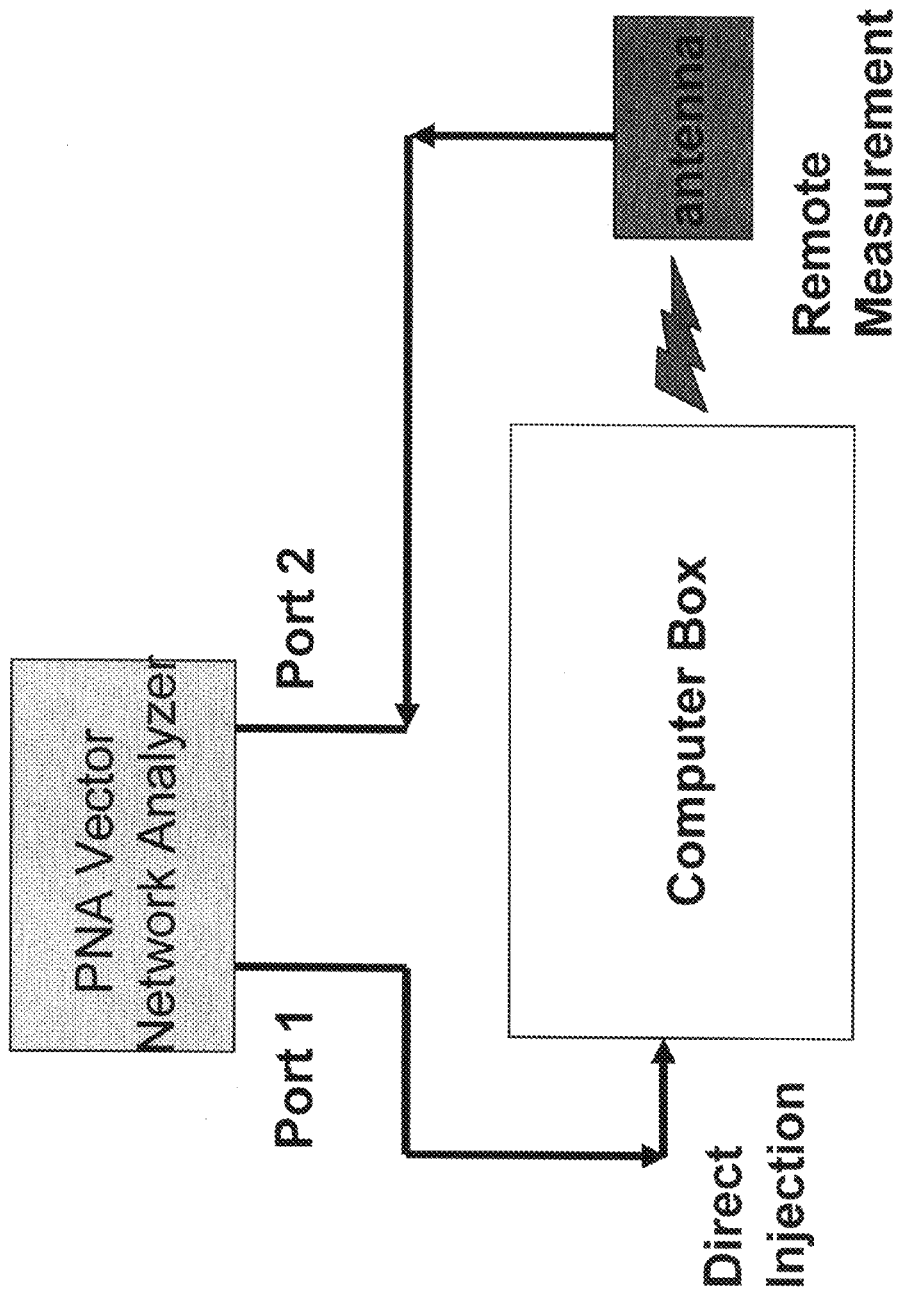
FIG. 23 illustrates a schematic of electromagnetic couplings with a computer box according to the present invention.
Figure 24:
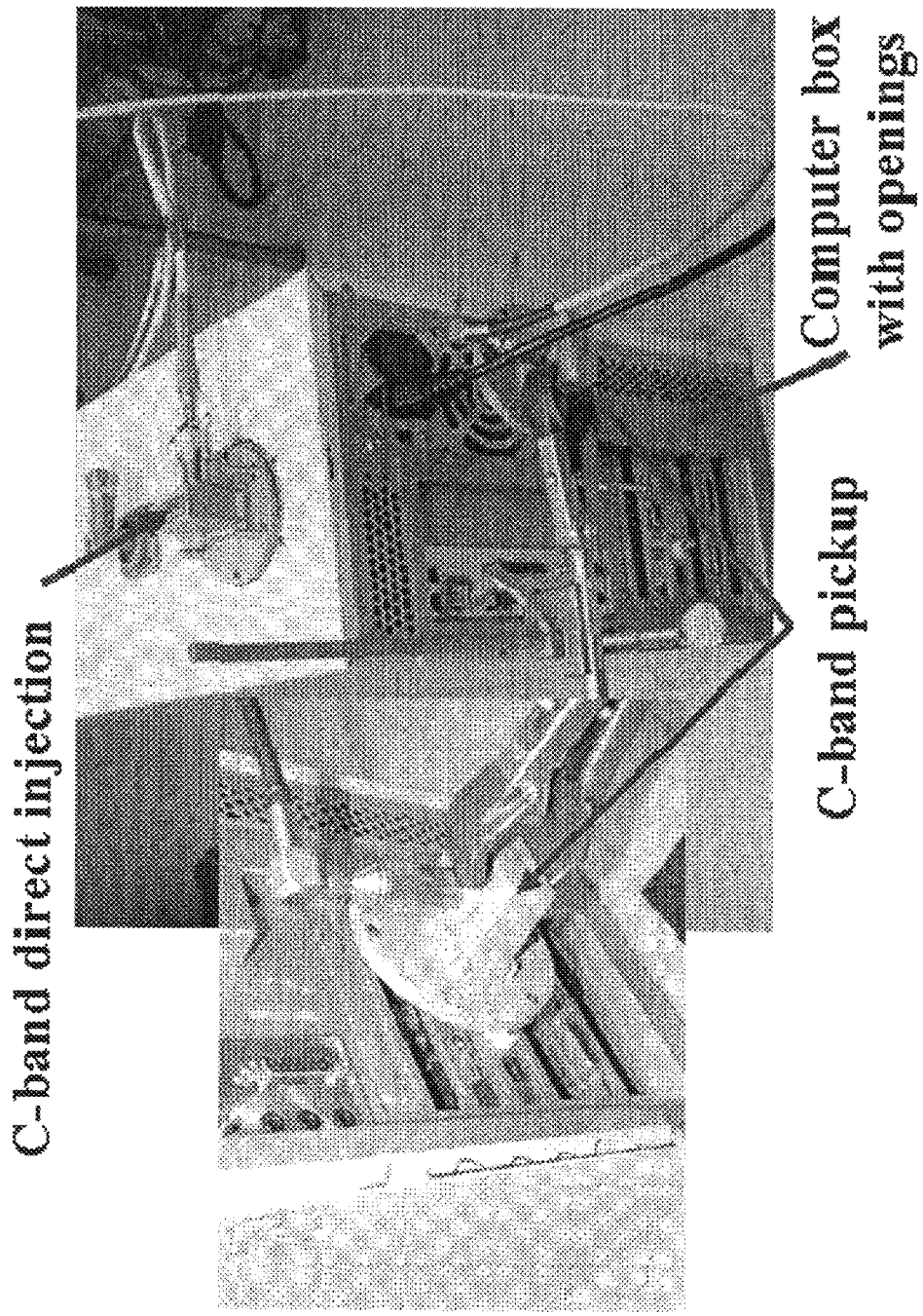
FIG. 24 shows a set-up for direct injection/remote measurement of computer box using C-band.
Figure 25:
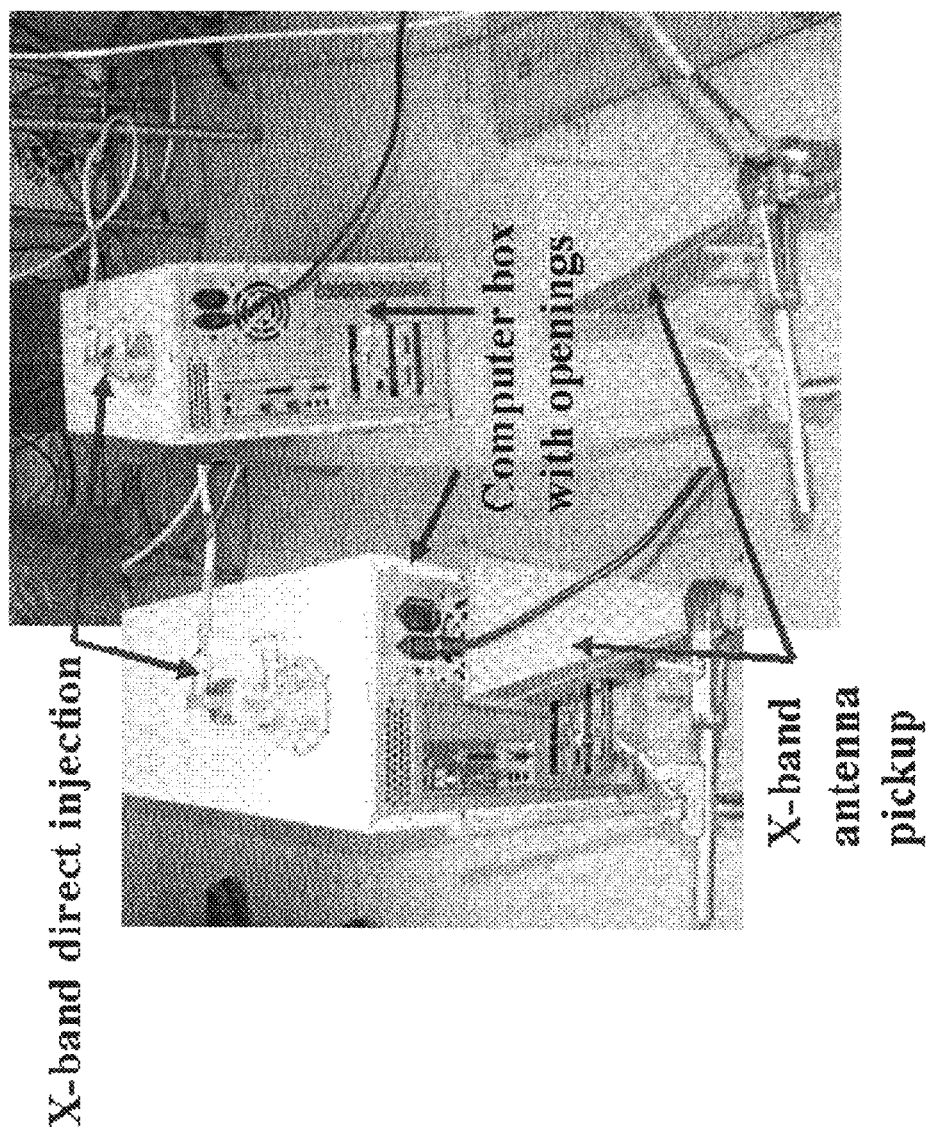
FIG. 25 shows a set-up for direct injection/remote measurement of computer box using X-band.

Using the techniques to develop an "Electromagnetic Fingerprint" of a computer enclosure, the next step is to determine if this information can be obtained remotely. A signal was direct injected into the computer box enclosure and allowed to fill the interior of the computer box. Since all computer boxes have openings that allow some electromagnetic energy to escape, an external antenna was used to pick up and characterize the strength of the emitted signal. A schematic diagram of the measurement is shown in FIG. 23. A CW signal from a PNA vector network analyzer is direct injected into the computer box and measured remotely with an antenna, which is connected to port 2 of the PNA. FIG. 24 shows a set-up for direct injection/remote measurement of the computer box EMF using C-band pickups. FIG. 25 shows a set-up for direct injection/remote measurement of the computer box EMF using X-band pickups. In both cases, a C- or X-band waveguide adapter is located on the top of the enclosure, while an external antenna is used to pick up the signal that leaks out of the computer box. Measurements of transmission ($S_{21}$) are performed in the frequency domain to establish the general nature of emission from the computer box.

Figure 26:
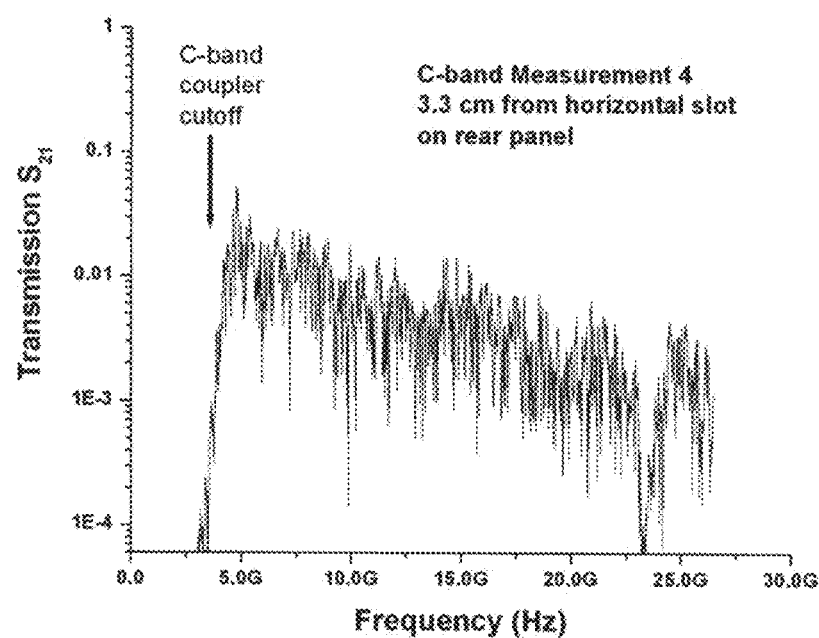
FIG. 26 illustrates transmission measurement for a signal direct-injected into a computer box through a C-band coaxial-to-waveguide coupler.

The transmission measurements ($S_{21}$) were performed with a PNA network analyzer as shown in FIG. 23. These measurements are uncalibrated because only general trends and order of magnitude estimates are needed. The measurements are performed in an "office environment," with the computer plugged in to an outlet and standing on the floor of the room, surrounded by desks and chairs, etc. A typical result with the C-band experiment is shown in FIG. 26. In FIG. 26, the transmission is cutoff below about 3 GHz, which is the cutoff frequency of the C-band couplers. There is a substantial transmitted signal peaking at about 5 GHz, dropping by another order of magnitude by about 20 GHz. This shows that about 1% of the direct injected signal is able to leak out of the back of the computer box, giving the opportunity to perform remote measurements of EMFs. The results shown in FIG. 26 are taken from measurement of $S_{21}$ for a signal direct-injected into the computer box through a C-band coaxial-to-waveguide coupler, and measured with another C-band coupler held in free space approximately 3.3 cm away from the horizontal slot on the rear panel of the computer box (see FIG. 24).

Figure 27:
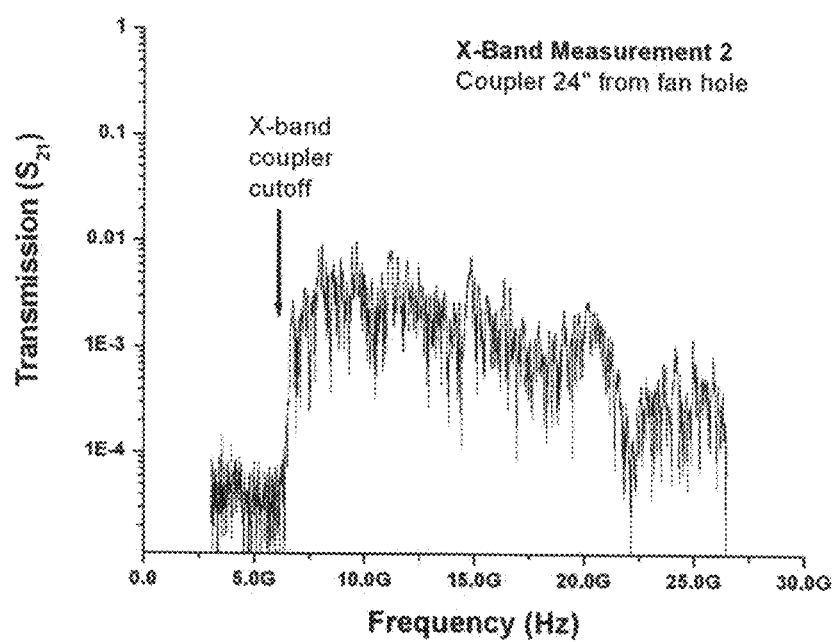
FIG. 27 illustrates transmission measurement for a signal direct-injected into a computer box through an X-band coaxial-to-waveguide coupler.

A second set of measurements were done with an X-band coupler direct injection and an X-band horn antenna for pickup (see FIG. 25). In this case, the receiver cone is approximately 2 feet away from the computer box rear panel. The measured $S_{21}$ data is shown in FIG. 27. In FIG. 27, the signals are cut off below the X-band cutoff frequency of 6.5 GHz. However, they do come to a value about 1% for frequencies below 10 GHz. This is a true "remote" measurement that shows recovery of significant signal from the computer box.

From these measurements, it can be seen that the 4-10 GHz range is a good one for measuring output from a computer box, which compliments the above measurement results in which it was found that a computer box has a distinct and measurable EMF in the 5-8 GHz range.

Remote Measurements of the Computer Box EMF

Figure 28:
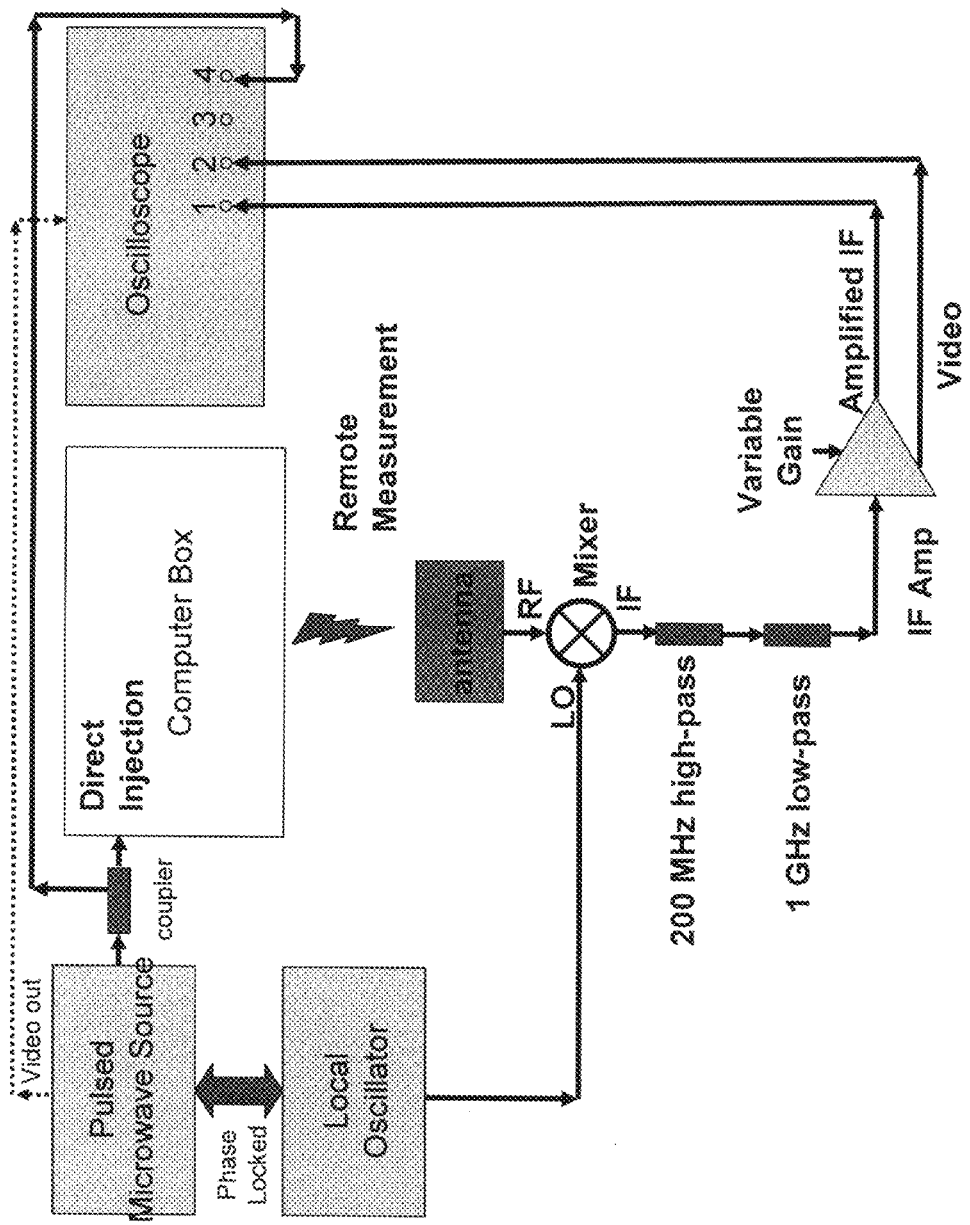
FIG. 28 illustrates a schematic for a remote electromagnetic fingerprint measurement receiver system according to the present invention.

FIG. 28 shows a schematic diagram of a remote EMF measurement receiver system. The system uses a pulsed microwave source, such as an Agilent E8527C, a local oscillator, such as an HP 83620B, a signal mixer, such as an Anaren 73128, and an oscilloscope, such as a Tektronix 6804B. In the system shown in FIG. 28, all the sources and oscilloscope are under computer control.

Figure 29:
FIG. 29 shows direct injection and emission locations from a computer box.

Referring to FIG. 29, a pulsed microwave signal is directly injected into a computer box. The signal leaks out of the box through various routes, including cooling holes and open slots in the rear of the computer. Note the numerous round and arc-shaped ventilation holes, as well as the open card slots near the bottom of the illustration in FIG. 29. A C-band coax-to-waveguide adapter is held up to 1 meter away from the back of the computer box, similar to the setup shown in FIG. 24. That measured RF signal is sent into a mixer, along with an oscillator signal from a phase-locked source that is 550 MHz below the RF carrier frequency. The resulting intermediate frequency (IF) at 550 MHz is filtered and sent to a variable-gain amplifier before being measured on the oscilloscope. This receiver system is able to take weak EMF signals from the computer box and convert them into volt-level signals on the oscilloscope.

Figure 30:
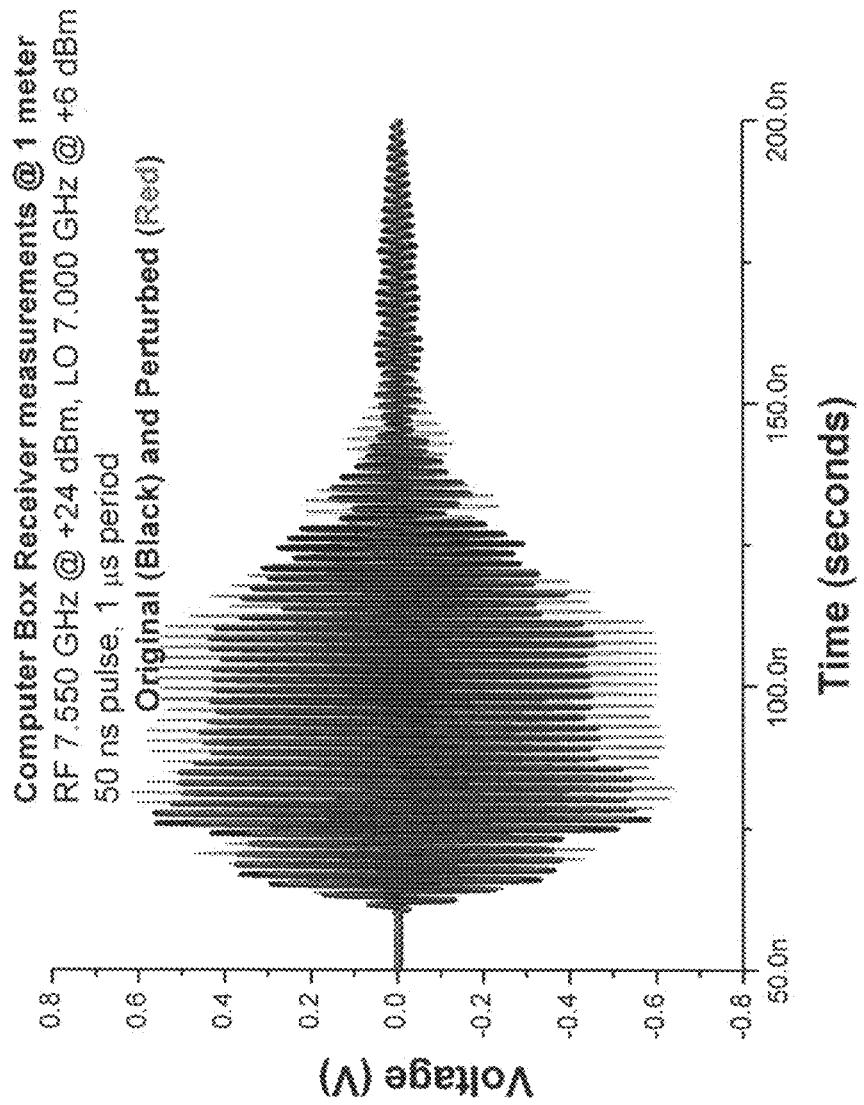
FIG. 30 illustrates a plot of measured voltage vs. time for a signal from the computer box of FIG. 29 for two cases.

FIG. 30 shows plots of measured voltage vs. time of the 550 MHz IF signal from the computer box for two cases. In this case the signal direct injected into the computer box is a 50-ns-long pulse of 7.550 GHz signal (LO at 7.000 GHz). The emitted signal is measured approximately 1 meter from the back of the computer box. The black trace in FIG. 30 shows the amplitude and phase modulation of the computer box EMF output in the original (unperturbed) case. The red trace in FIG. 30 shows the output of the computer box when a surrogate "pc board" was added into the top open slot on the rear of the computer box (FIG. 29). The perturbation was a 6" long by 2" wide piece of Aluminum foil. A clear change in the signal is observed from this perturbation.

Figure 31:
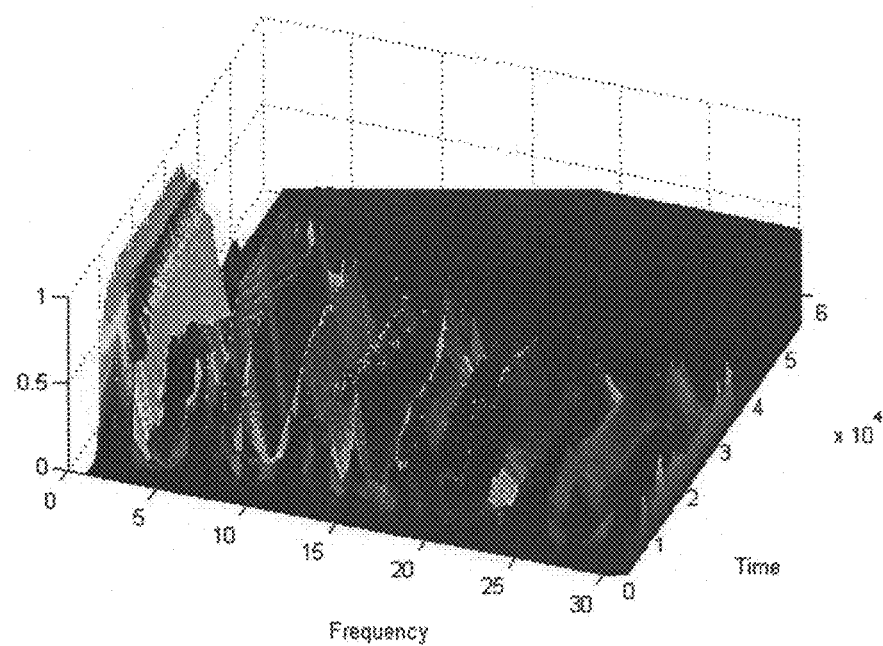
FIG. 31 shows a remote receiver electromagnetic fingerprint of an unperturbed computer box of FIG. 29.
Figure 32:
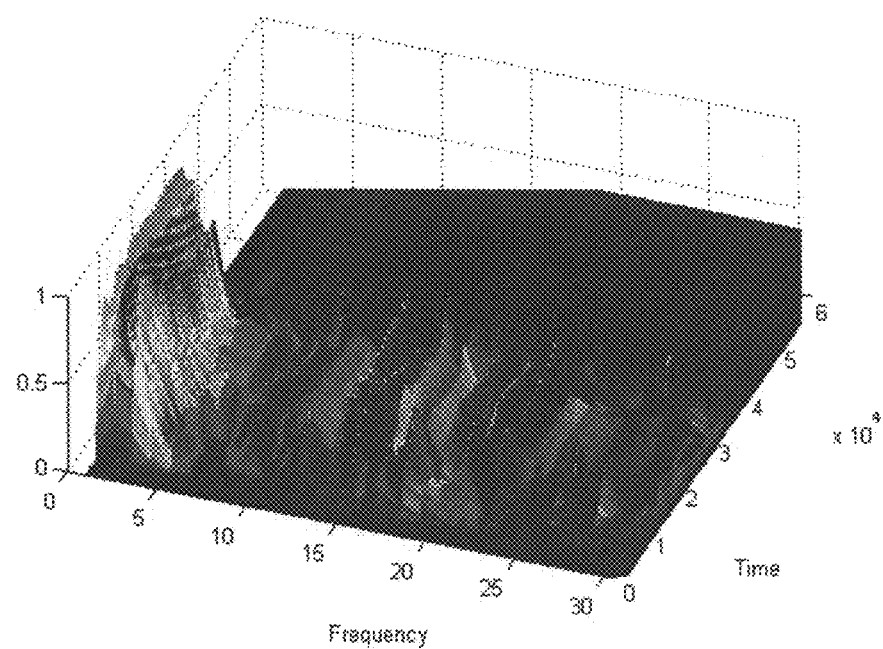
FIG. 32 shows a remote receiver electromagnetic fingerprint of a perturbed computer box of FIG. 29.

Using the setup shown in FIG. 28, the RF carrier frequency was stepped from 5 GHz to 8 GHz in 0.1 GHz steps over about 120 ns. The receiving antenna was placed approximately 1 meter from the back of the computer box, and the IF amplifier gain was set to recover a ~1 volt peak-to-peak signal during the pulse at 8 GHz. Direct injection of 50-ns-long pulses was used. The RF is +24 dBm, the LO is +6 dBm, and the oscilloscope is triggered on the video output of the RF source. FIG. 31 shows the EMF for the unperturbed case, and FIG. 32 shows the EMF for the case of a 6" long by 2" wide Aluminum foil strip added to the upper open slot of the computer box of FIG. 29. There are clear differences in the EMFs, as observed before in direct injection and direct pickup modes. Using the normalized and exponential weighted EMF method discussed above, a correlation can be calculated between these two images of r=0.61.

It is clear that the EMF can be measured at even greater separations with suitable gain in the receiver chain.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A method to determine a unique waveform fingerprint of an object having an enclosed space, comprising the steps of:
    (a) injecting a waveform having a first frequency into the enclosed space of the object, wherein a wavelength of the first frequency of the waveform is smaller than a characteristic dimension of the enclosure such that a plurality of resonant modes are simultaneously excited;
    (b) collecting the waveform amplitude and phase as a function of time after it has been reflected from or scattered by physical features or structures in the enclosed space of the object;
    (c) incrementally step increasing the frequency of the injected waveform and injecting it into the object over a predetermined range of frequencies;
    (d) collecting each waveform amplitude and phase as a function of time after it has been reflected from or scattered by physical features or structures in the enclosed space of the object over the predetermined range of frequencies; and
    (e) generating a waveform fingerprint of the object from a plurality of collected waveforms, wherein the waveform fingerprint is a composite frequency, time, amplitude and phase representation that characterizes the interior configuration or physical features or structures in the enclosed space of the object.

2. The method of claim 1 wherein generating the waveform fingerprint further comprises the steps of:
    determining an in-phase (I) component of said waveform;
    determining a quadrature (Q) component of said waveform; and
    generating the waveform fingerprint using the in-phase and quadrature components.

3. The method of claim 1, wherein the fingerprint is displayed in a format perceptible to a human being, said format being selected from the group consisting of visual, audible, tactile, and other human sensory perception formats.

4. The method of claim 1, wherein the waveform is remotely transmitted into the enclosed space of the object.

5. The method of claim 1, wherein the waveform is collected remotely from the object.

6. The method of claim 5, wherein the waveform is collected by a receiver capable of collecting various types of waveforms having a variety of frequencies.

7. The method of claim 1, wherein the sensitivity and performance of the method may be increased by at least one of:
    amplifying signal strength, mixing signals, providing further synthesized signals or providing phase discriminated signals.

8. The method of claim 1 further comprising the steps of:
    increasing the frequency over time in a step wise, incremental manner.

9. A method for distinguishing between objects, comprising the steps of:
    generating a waveform of a first object by transmitting a waveform having a predetermined frequency through the first object, wherein a wavelength of the predetermined frequency of the waveform is smaller than a characteristic dimension of the enclosure such that a plurality of resonant modes are simultaneously excited;
    receiving the waveform amplitude and phase as a function of time after it has been reflected from or scattered by physical features or structures in the enclosed space of the first object;
    incrementally step increasing the frequency of the waveform and transmitting the waveform through the first object over a predetermined range of frequencies;
    collecting each waveform amplitude and phase as a function of time after it has been reflected from or scattered by physical features or structures in the enclosed space of the first object over the predetermined range of frequencies; and
    generating a waveform fingerprint of the first object from a plurality of collected waveforms, wherein the waveform fingerprint is a composite representation comprising frequency, time, amplitude and phase representation that characterizes the interior configuration of the first object;
    generating a waveform fingerprint of a second object by:
    transmitting a waveform having the predetermined frequency through the second object wherein the wavelength of the predetermined frequency of the waveform is smaller than a characteristic dimension of the enclosure such that a plurality of resonant modes are simultaneously excited;
    receiving the waveform amplitude and phase as a function of time after it has been reflected from or scattered by physical features or structures in the enclosed space of the second object;
    incrementally step increasing the frequency of the waveform and retransmitting the waveform through the second object over a predetermined range of frequencies;
    collecting each waveform amplitude and phase as a function of time after it has been reflected from or scattered by physical features or structures in the enclosed space of the second object over the predetermined range of frequencies; and
    generating a waveform fingerprint of the second object from a plurality of collected waveforms, wherein the waveform fingerprint is a composite representation comprising frequency, time, amplitude and phase information that characterizes the interior configuration of the second object; and
    determining a difference between the first and second objects by comparing the waveform fingerprint of the first object to the waveform fingerprint of the second object.

10. The method of claim 9, wherein the objects are nominally identical.

11. The method of claim 9, wherein the waveform fingerprint for the objects is generated by performing the following:
   (a) at least one of directly or remotely injecting a first frequency determined waveform into an enclosure, wherein a wavelength of the first frequency of the waveform is smaller than a characteristic dimension of the enclosure such that a plurality of resonant modes are simultaneously excited, into an object and after the waveform has been reflected from or scattered by physical features or structures in the enclosed space of the object, collecting the waveform's amplitude, phase, and time in at least one of a direct or remote manner;
   (b) repeating step (a), at least one more time, using a waveform having a second frequency within a predetermined range of frequencies, wherein the waveform frequency is incrementally step increased within the range;
   (c) generating a waveform fingerprint of the object from the plurality of collected waveforms by determining an in-phase (I) component of the waveform, determining a quadrature (Q) component of the waveform, and calculating the waveform fingerprint using the in-phase and quadrature components; and
   (d) displaying the generated waveform fingerprint in a format perceptible to a human being.

12. The method of claim 11, wherein the step of determining a difference between the waveforms by comparing their separate waveform fingerprints further comprises the step of performing cross correlation of the waveform fingerprints.

13. The method of claim 9, wherein the waveform fingerprint for the objects is generated by performing the following:
   increasing the frequency of the injected waveform over time in a step wise, incremental manner.

14. A waveform fingerprint system for an object having an enclosed space, comprising:
   a waveform generator connected with an object, the generator producing and injecting a plurality of waveforms directly into the enclosed space of the object over a selected range of frequencies, wherein wavelengths of the frequencies in the selected range of frequencies of the plurality of waveforms are smaller than a characteristic dimension of the enclosed space such that a plurality of resonant modes are simultaneously excited,
   a receiver for collecting each of said plurality of waveforms after the waveforms have been reflected from or scattered by physical features or structures in the enclosed space of the object, and
   means for comparing the collected waveforms to the injected waveforms and to generate the waveform fingerprint, wherein the waveform fingerprint is a composite representation comprising frequency, time, amplitude and phase information that characterizes the interior configuration of the object.

15. The system of claim 14, wherein the waveform fingerprint is generated by calculation using the in-phase and quadrature components of the collected waveform.

16. The system of claim 14, wherein the waveform generator produces at least one of electromagnetic, acoustic, or quantum mechanical waveforms.

17. The system of claim 16, wherein the electromagnetic waveform emitted by the generator has at least one of a determined, specific frequency or predetermined frequency range, preferably a range from megahertz (MHz) through Gigahertz (GHz), more preferably 550 MHz-20 GHz, preferably the frequency is in the range of 1-10 GHz, and more preferably the frequency is in the range of 5-8 GHz, C-band, or X-band.

18. The system of claim 16, wherein the waveform frequency emitted by the generator is incrementally step increased, in steps ranging from 0.01-1 GHz, more preferably 0.04-0.07 GHz, within the predetermined range of frequencies.

19. The system of claim 16, wherein the waveform generator has waveform emission time periods ranging from 1 nanosecond (ns) to 150 ns, more preferably 40 ns-120 ns.

20. The system of claim 14, wherein the object has an enclosed space and is at least one of a computing device, server, desktop computer or a laptop computer.

21. The system of claim 14, wherein the receiver includes a multi-channel input capability, which includes the capability of receiving at least one of a direct, intermediate or remote signal, and is capable of collecting various types of waveforms selected from the group consisting of electromagnetic, acoustic and quantum mechanical.

22. The system of claim 14, wherein at least one of the waveform generator, object or receiver may be connected with system components selected from the group consisting of a coupling device, an oscillator, a synthesizer, a phase discriminator, a mixer, an amplifier, and a filter.

23. The system of claim 14, wherein the system is automatically controlled.

* * * * *